(12) United States Patent
Waumans et al.

(10) Patent No.: US 9,403,395 B2
(45) Date of Patent: Aug. 2, 2016

(54) COLOUR LASER MARKABLE LAMINATES AND DOCUMENTS

(71) Applicant: AGFA-GEVAERT, Mortsel (BE)

(72) Inventors: Bart Waumans, Mortsel (BE); Paul Callant, Mortsel (BE); Johan Loccufier, Mortsel (BE)

(73) Assignee: AGFA-GEVAERT, Mortsel (BE)

( * ) Notice: Subject to any disclaimer, the term of this patent is extended or adjusted under 35 U.S.C. 154(b) by 244 days.

(21) Appl. No.: 14/380,409

(22) PCT Filed: Mar. 12, 2013

(86) PCT No.: PCT/EP2013/054970
§ 371 (c)(1),
(2) Date: Aug. 22, 2014

(87) PCT Pub. No.: WO2013/135675
PCT Pub. Date: Sep. 19, 2013

(65) Prior Publication Data
US 2015/0290959 A1    Oct. 15, 2015

Related U.S. Application Data

(60) Provisional application No. 61/613,498, filed on Mar. 21, 2012.

(30) Foreign Application Priority Data

Mar. 16, 2012    (EP) ..................... 12159849

(51) Int. Cl.
*B41M 5/337*    (2006.01)
*B41M 5/323*    (2006.01)
(Continued)

(52) U.S. Cl.
CPC .............. *B41M 5/3375* (2013.01); *B32B 27/08* (2013.01); *B32B 27/36* (2013.01); *B32B 37/18* (2013.01); *B32B 38/0008* (2013.01); *B41M 5/323* (2013.01); *B41M 5/3335* (2013.01); *B41M 5/3372* (2013.01); *B41M 5/34* (2013.01); *B41M 5/41* (2013.01); *B41M 5/465* (2013.01); *B42D 25/382* (2014.10); *B32B 2255/10* (2013.01); *B32B 2255/24* (2013.01);
(Continued)

(58) Field of Classification Search
None
See application file for complete search history.

(56) References Cited

U.S. PATENT DOCUMENTS

| | | | |
|---|---|---|---|
| 4,602,263 A | 7/1986 | Borror et al. | |
| 4,720,449 A | 1/1988 | Borror et al. | |

(Continued)

FOREIGN PATENT DOCUMENTS

| | | | |
|---|---|---|---|
| EP | 1 852 270 A1 | 11/2007 | |
| EP | 2 181 858 A1 | 5/2010 | |
| WO | 96/00262 A1 | 1/1996 | |

OTHER PUBLICATIONS

Official Communication issued in International Patent Application No. PCT/EP2013/054970, mailed on May 7, 2013.

*Primary Examiner* — Robert S Loewe
(74) *Attorney, Agent, or Firm* — Keating and Bennett, LLP

(57) ABSTRACT

A color laser markable laminate includes at least a transparent polymeric support and a color forming layer including a leuco dye; an infrared dye; and a polymeric binder including vinyl acetate and at least 85 wt % of vinyl chloride based on the total weight of the binder; wherein the color laser markable laminate includes a specific phenol stabilizer sterically hindered by a ring containing three nitrogen atoms. A method for preparing a color laser marked document is also disclosed.

17 Claims, 2 Drawing Sheets

(51) Int. Cl.
  *B41M 5/333* (2006.01)
  *B41M 5/41* (2006.01)
  *B42D 25/382* (2014.01)
  *B32B 27/08* (2006.01)
  *B32B 27/36* (2006.01)
  *B32B 37/18* (2006.01)
  *B32B 38/00* (2006.01)
  *B41M 5/34* (2006.01)
  *B41M 5/46* (2006.01)
  *B41M 5/30* (2006.01)

(52) U.S. Cl.
  CPC ........ *B32B 2255/26* (2013.01); *B32B 2425/00* (2013.01); *B32B 2439/00* (2013.01); *B41M 5/30* (2013.01); *B41M 2205/04* (2013.01)

(56) References Cited

U.S. PATENT DOCUMENTS

| | | | |
|---|---|---|---|
| 4,917,730 A * | 4/1990 | Miller | B41M 5/30 106/31.05 |
| 4,917,977 A * | 4/1990 | Smothers | G03F 7/001 430/1 |
| 5,380,693 A | 1/1995 | Goto | |
| 5,395,138 A * | 3/1995 | Chang | B42D 25/29 283/114 |
| 5,955,224 A | 9/1999 | Caspar et al. | |
| 6,465,162 B1 * | 10/2002 | Kong | G03C 1/49872 430/350 |
| 8,786,651 B2 * | 7/2014 | Geuens | B41M 3/142 347/224 |
| 8,975,211 B2 * | 3/2015 | Waumans | 283/109 |
| 2002/0064728 A1 * | 5/2002 | Weed | B41C 1/1008 430/281.1 |
| 2003/0166467 A1 | 9/2003 | Azuma | |
| 2004/0104992 A1 * | 6/2004 | Kalishek | B42D 15/025 347/203 |
| 2004/0168598 A1 * | 9/2004 | Sampei | B41C 1/1025 101/463.1 |
| 2006/0264326 A1 | 11/2006 | Fisher et al. | |
| 2013/0229008 A1 * | 9/2013 | Van Aert | B41M 3/142 283/75 |
| 2013/0233932 A1 * | 9/2013 | Waumans | B41M 3/142 235/492 |

* cited by examiner

COLOUR LASER MARKABLE LAMINATES AND DOCUMENTS

CROSS-REFERENCE TO RELATED APPLICATIONS

This application is a 371 National Stage Application of PCT/EP2013/054970, filed Mar. 12, 2013. This application claims the benefit of U.S. Provisional Application No. 61/613,498, filed Mar. 21, 2012, which is incorporated by reference herein in its entirety. In addition, this application claims the benefit of European Application No. 12159849.4, filed Mar. 16, 2012, which is also incorporated by reference herein in its entirety.

BACKGROUND OF THE INVENTION

1. Field of the Invention

This invention relates to colour laser marking, more specifically to stabilizers for colour laser markable laminates and documents, especially security documents.

2. Description of the Related Art

Articles are laser marked in order to ensure product safety and authenticity. For example, packaging material of pharmaceuticals is laser marked to enable a consumer to know the genuineness of a product. Security cards are widely used for various applications such as identification purposes (ID cards) and financial transfers (credit cards). Such cards typically consist of a laminated structure consisting of various papers or plastic laminates and layers wherein some of them may carry alphanumeric data and a picture of the card holder. So called 'smart cards' can also store digital information by including an electronic chip in the card body.

A principal objective of such articles and security cards is that they cannot be easily modified or reproduced in such a way that the modification or reproduction is difficult to distinguish from the original.

Two techniques frequently used for preparing security documents are laser marking and laser engraving. In literature, laser engraving is often incorrectly used for laser marking. In laser marking, a colour change is observed by local heating of material, while in laser engraving material is removed by laser ablation.

Today, laser marking employed in the manufacture of security documents consists solely of a "black" laser marking method via the carbonization of a polymer, usually polycarbonate as disclosed in e.g. EP 2181858 A (AGFA). There has been considerable interest in being able to produce colour images through laser marking.

U.S. Pat. No. 4,720,449 (POLAROID) discloses a thermal imaging method for producing colour images on a support carrying at least one layer of a colourless compound, such as di- or triarylmethane, by conversion of electromagnetic radiation into heat. The laser beam may have different wavelengths in a range above 700 nm with at least about 60 nm apart so that each imaging layer having a different infrared absorber may be exposed separately to convert a colourless triarylmethane compound into a coloured form. However, there is no disclosure on stabilizers for preventing additional colour formation upon longer daylight storage, e.g. on top of a car's dashboard.

EP1852270 A1 (TECHNO POLYMER CO) discloses a laminate for laser marking comprising a layer with a multicolor developing laser marking thermoplastic polymer composition capable of producing markings having two or more different color tones by irradiating thereto two or more laser lights having different energies from each other. When the content of a thermosetting polymer in the thermoplastic polymer composition for laser marking lies within a specified range, the obtained laser-marking portions are free from discoloration.

WO9600262 A1 (NIPPON KAYAKU) discloses a laser markable composition comprising an energy ray curing resin, a leuco dye and a color developer. Discoloration of the laser marking composition was found to be suppressed or minimized when the color developer and the leuco dye exhibited low solubility in toluene, particularly a solubility below 5 w/v % at 25° C.

U.S. Pat. No. 4,602,263 (POLAROID) discloses a thermal imaging method for forming color images which relies upon the irreversible unimolecular fragmentation of one or more thermally unstable carbamate moieties of an organic compound to effect a visually discernible color shift from colourless to colored, from colored to colourless or from one color to another. However, there is no disclosure on stabilizers for preventing additional colour formation upon longer daylight storage.

U.S. Pat. No. 5,955,224 (FUJI) disclose a thermally imagable composition comprising: (a) at least one near IR absorbing dye; (b) at least one hexaaryl-bimidazole compound; (c) at least one leuco dye; (d) at least one acid-generating compound; and (e) a polymeric binder which is preferably a polyvinyl butyral and brominated polystyrene; and optionally at least one UV stabilizer and/or at least one inhibitor of color formation.

There is still a need for colour laser markable laminates improved for preventing additional colour formation upon long daylight storage, especially at elevated temperatures, and having no or minor influence on colour formation by laser marking, e.g. high optical densities.

SUMMARY OF THE INVENTION

In order to overcome the problems described above, preferred embodiments of the present invention include a colour laser markable laminate as defined below.

It has been surprisingly found that colour laser markable laminates including a leuco dye and an infrared dye could be improved for preventing additional colour formation upon prolonged daylight storage, e.g. on top of a car's dashboard, by making a specific combination of a polymeric binder comprising vinyl acetate and at least 85 wt % of vinyl chloride based on the total weight of the binder and a specific phenol stabilizer sterically hindered by a ring containing three nitrogen atoms.

Further advantages and preferred embodiments of the present invention will become apparent from the following description.

BRIEF DESCRIPTION OF THE DRAWINGS

In the drawings FIG. 1 to FIG. 4 the following numbering is adhered to.

11, 21, 31 and 41=transparent polymeric support, e.g. PET-C;
12, 22, 32 and 42=colour forming layer;
23, 33 and 43=outer layer; and
34 and 44=opaque white core support, e.g. white PETG.

DETAILED DESCRIPTION OF THE PREFERRED EMBODIMENTS

Figure 1:
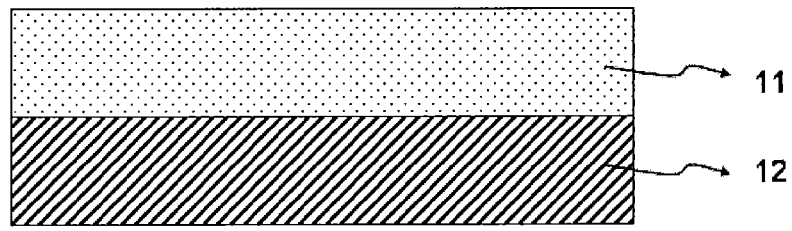
FIG. 1 shows a cross section of a preferred embodiment of a colour laser markable laminate according to the present invention.
Figure 2:
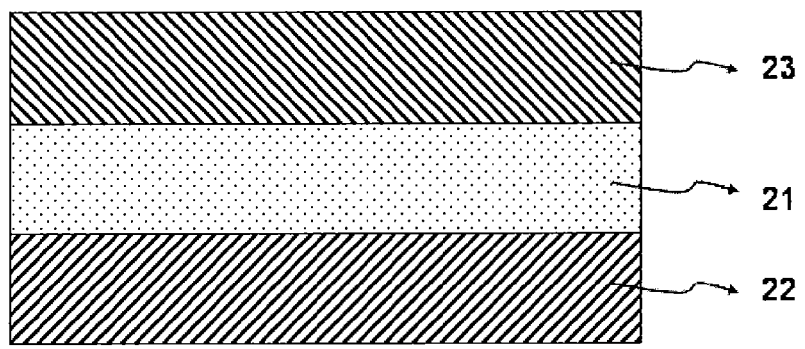
FIG. 2 shows a cross section of another preferred embodiment of a colour laser markable laminate according to the present invention.
Figure 3:
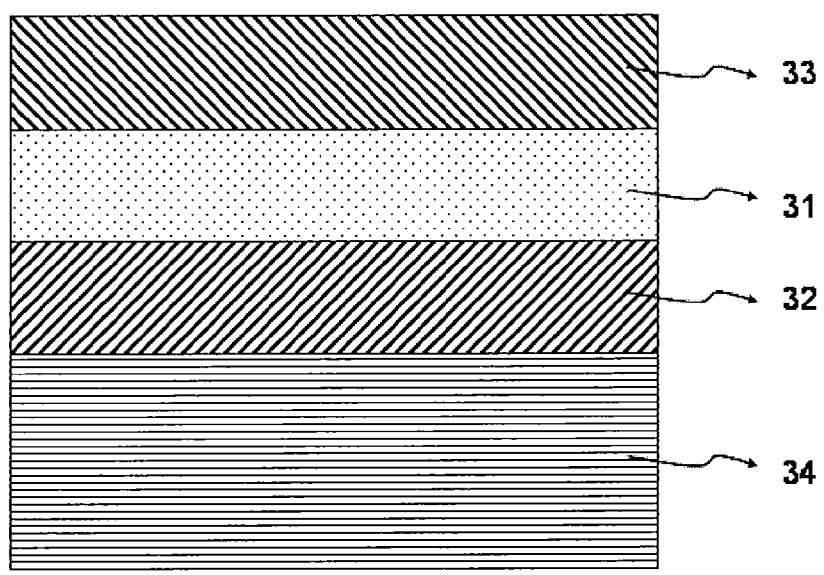
FIG. 3 shows a cross section of a preferred embodiment of a colour laser markable document according to the present invention including on one side a colour laser markable laminate according to FIG. 2.

The terms "polymeric support" and "foil", as used herein, mean a self-supporting polymer-based sheet, which may be associated with one or more adhesion layers e.g. subbing layers. Supports and foils are usually manufactured through extrusion.

The term "layer", as used herein, is considered not to be self-supporting and is manufactured by coating it on a (polymeric) support or foil.

The term "leuco dye" as used herein refers to compounds which change from essentially colourless to colored when heated, with or without the presence of other reagents.

"PET" is an abbreviation for polyethylene terephthalate.

"PETG" is an abbreviation for polyethylene terephthalate glycol, the glycol indicating glycol modifiers which are incorporated to minimize brittleness and premature aging that occur if unmodified amorphous polyethylene terephthalate (APET) would be used in the production of cards.

"PET-C" is an abbreviation for crystalline PET, i.e. a biaxially stretched polyethylene terephthalate. Such a polyethylene terephthalate support has excellent properties of dimensional stability.

The definitions of security features correspond with the normal definition as adhered to in the "Glossary of Security Documents—Security features and other related technical terms" as published by the Consilium of the Council of the European Union on Aug. 25, 2008 (Version: v.10329.02.b.en) on its website: http://www.consilium.europa.eu/prado/EN/glossaryPopup.html.

The term "alkyl" means all variants possible for each number of carbon atoms in the alkyl group i.e. methyl, ethyl, for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methyl-butyl etc.

The term "alkoxy" means all variants possible for each number of carbon atoms in the alkyl group i.e. methoxy, ethoxy, for three carbon atoms: n-propoxy and isopropoxy; for four carbon atoms: n-butoxy, isobutoxy and tertiary-butoxy etc.

Colour Laser Markable Laminates and Documents

The colour laser markable laminate according to a preferred embodiment of the present invention includes at least a transparent polymeric support and a colour forming layer comprising a leuco dye, an infrared dye, and a polymeric binder comprising vinyl acetate and at least 85 wt % of vinyl chloride based on the total weight of the binder, wherein the colour laser markable laminate includes a phenol stabilizer sterically hindered by a ring containing three nitrogen atoms represented by Formula (I):

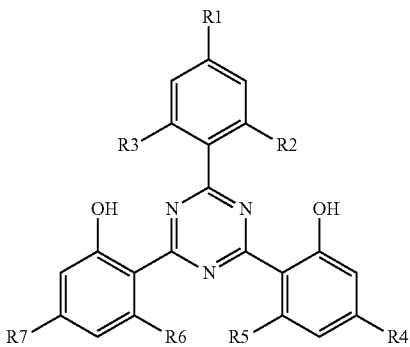

or Formula (II):

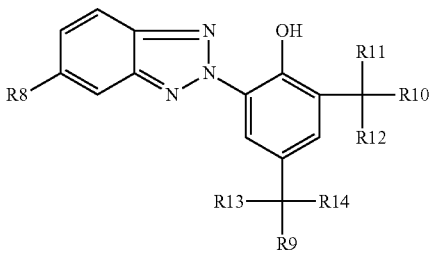

wherein
R1 to R7 is each independently selected from the group consisting of hydrogen, an alkyl group containing 1 to 12 carbon atoms and an alkoxy group containing 1 to 12 carbon atoms;
R8 represents hydrogen or a halogen atom;
R9 and R10 is each independently selected from the group consisting of hydrogen, an alkyl group containing 1 to 6 carbon atoms and an aryl group containing 1 to 12 carbon atoms; and
R11 to R14 is each independently selected from the group consisting of an alkyl group containing 1 to 6 carbon atoms.

In a preferred embodiment, R1 to R7 is each independently selected from the group consisting of hydrogen, an alkyl group containing 1 to 8 carbon atoms, more preferably an alkyl group containing 1 to 6 carbon atoms, and an alkoxy group containing 1 to 8 carbon atoms, more preferably an alkoxy group containing 1 to 6 carbon atoms.

In a preferred embodiment, R9 and R10 is each independently selected from the group consisting of hydrogen, an alkyl group containing 1 to 8 carbon atoms, more preferably an alkyl group containing 1 to 6 carbon atoms, and an aryl group containing 1 to 12 carbon atoms, more preferably an alkyl group containing 1 to 10 carbon atoms.

In a preferred embodiment, R5 and R6 both represent hydrogen.

In a preferred embodiment, R11 to R14 all represent methyl and preferably R9 and/or R10 represent methyl or phenyl.

In a preferred embodiment, R8 represents a chlorine atom.

In a preferred embodiment, R9 and/or R10 represent a phenyl substituted by an alkyl group or a napthyl group.

In a particularly preferred embodiment, the colour laser markable laminate includes a phenol stabilizer sterically hindered by a ring containing three nitrogen atoms is selected from the group consisting of IS-1 to IS-4.

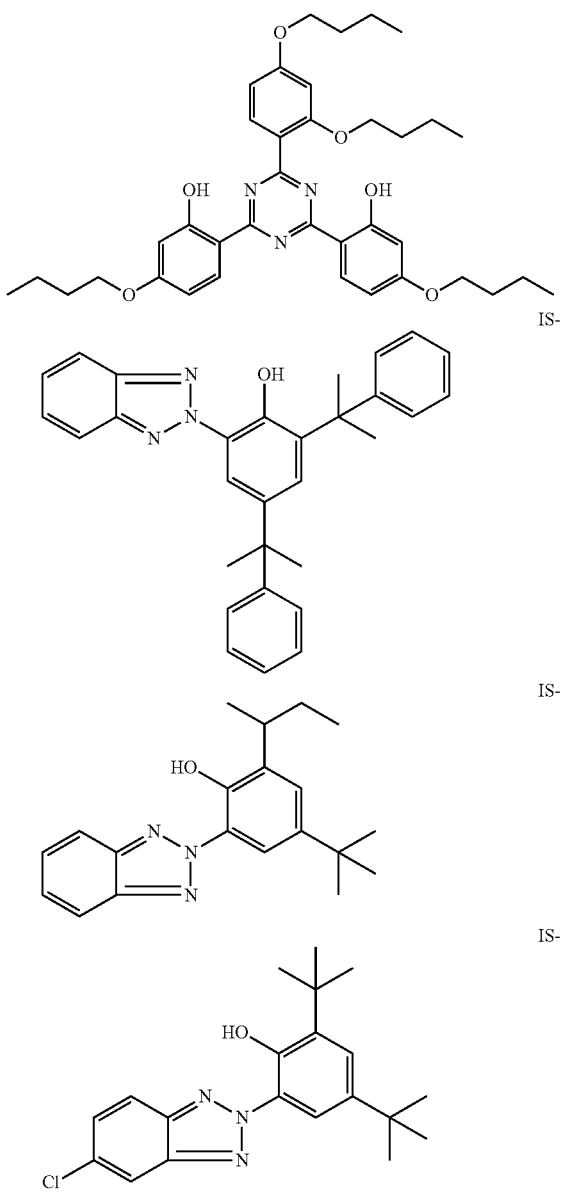

The phenol stabilizer sterically hindered by a ring containing three nitrogen atoms is preferably present in the colour forming layer, but may also be present in an outer layer on a side of the transparent polymeric support opposite to the side of the colour forming layer, or may be present in both the colour forming layer and the outer layer.

In a very preferred embodiment, the colour forming layer of the colour laser markable laminate includes the phenol stabilizer sterically hindered by a ring containing three nitrogen atoms, an infrared dye, a leuco dye as the colour forming compound, a polymeric binder including at least 85 wt % of a vinyl chloride and 1 wt % to 15 wt % of vinyl acetate both based on the total weight of the binder, and optionally a hydrogen donor-precursor.

One or two colour laser markable laminates may be used to prepare a colour laser markable document including an opaque white core support.

In one preferred embodiment of the colour laser markable document, the colour forming layer is located between the opaque white core support and the transparent polymeric support of a colour laser markable laminate.

In another preferred embodiment of the colour laser markable document, a second colour laser markable laminate is used in the document on the other side of the opaque white core support, wherein the colour forming layer of the second laminate is located between the opaque white core support and the transparent polymeric support of the second laminate.

The colour laser markable document may contain on the same side of the opaque white core support as the colour forming layer at least one second colour forming layer capable of forming a different colour.

The colour laser markable document according to a preferred embodiment of present invention contains at least one colour forming layer, but preferably contains two, three or more colour forming layers on the same side of the opaque white core support for producing a multi-coloured document.

The colour laser markable document according to a preferred embodiment of present invention preferably contains at least three colour forming layers on at least the one side of the opaque white core support wherein the at least three colour forming layers include different infrared dyes and also different leuco dyes.

An infrared dye not only delivers the heat for the colour forming action, but also has the advantage that there is no or minimal absorption in the visible spectrum and thus there is no or minimal interference with the colours formed by the one or more colour forming layers. This also allows having, for example, a pure white background in a security document.

In a preferred embodiment the colour forming layer is capable of forming a cyan or blue colour image on laser marking. The article preferably contains two other colour forming layers for forming a magenta respectively a yellow image or for forming a red respectively a green image, since most colour management systems for producing colour images are based on either a CMY or RGB colour reproduction.

The colour laser markable document is preferably a security document precursor, more preferably including an electronic chip.

In a preferred embodiment, the colour laser marked document is a security document, preferably selected from the group consisting of a passport, a personal identification card and a product identification document.

The colour laser markable document preferably also contains electronic circuitry, more preferably the electronic circuitry includes a RFID chip with an antenna and/or a contact chip. The security document is preferably a "smart card", meaning an identification card incorporating an integrated circuit. In a preferred embodiment the smart card includes a radio frequency identification or RFID-chip with an antenna. Inclusion of electronic circuitry makes forgery more difficult.

The colour laser markable document preferably has a format as specified by ISO 7810. ISO 7810 specifies three formats for identity cards: ID-1 with the dimensions 85.60 mm×53.98 mm, a thickness of 0.76 mm is specified in ISO 7813, as used for bank cards, credit cards, driving licenses and smart cards; ID-2 with the dimensions 105 mm×74 mm, as used in German identity cards, with typically a thickness of 0.76 mm; and ID-3 with the dimensions 125 mm×88 mm, as used for passports and visa's. When the security cards include one or more contactless integrated circuits then a larger thickness is tolerated, e.g. 3 mm according to ISO 14443-1.

In another preferred embodiment, the colour laser markable document is a product identification document which is usually attached to the packaging material of the product or to the product itself. The product identification document not only allows to verify the authenticity of the product, but also to maintain the attractive look of a product (packaging).

Laser Marking Methods

The method for preparing a colour laser marked document according to a preferred embodiment of the present invention comprises the steps of:

a) laminating a colour laser markable laminate according to a preferred embodiment of present invention onto an opaque white core support; and
b) laser marking the colour forming layer by an infrared laser.

In a preferred embodiment of the method, the opaque white core support is a PETG support In a preferred embodiment of the method, the colour laser marked document is a security document.

In a preferred embodiment of the colour laser marking method, the document is laser marked through a transparent biaxially stretched polyethylene terephthalate foil (PET-C). This PET-C foil is preferably used as support for the colour forming layer.

The advantage of PET-C foils, such as PETix™ from Agfa-Gevaert NV, it is that is very durable and resistant to mechanical influences (flexion, torsion, scratches), chemical substances, moisture and temperature ranges. This is especially useful for security documents such as identification cards and credit cards for which the average daily usage has augmented substantially from less than 1 time per week to 4 times per day. The card body has to withstand not only this increased usage, but also the associated storage conditions. Cards are no longer safely tucked away in cabinets at home or seldom-opened wallets, but are now loosely put away in pockets, purses, sport bags etc.—ready for immediate use.

PVC (polyvinylchloride) is the most widely used material for plastic cards but has low durability of the card body, resulting in an effective lifetime of only 1-3 years, much lower than the lifetime of the often expensive chips included in the card. Other materials like Teslin™ and ABS are only suitable for very low-end or single-use cards. PC (polycarbonate) can be used for longer-life and more secure ID cards, but has a high production cost and a low resistance to torsion, scratching and chemicals.

Colour Forming Layers

The colour forming layer(s) can be coated onto a support by any conventional coating technique, such as dip coating, knife coating, extrusion coating, spin coating, slide hopper coating and curtain coating. Preferably the colour forming layer is coated with a slide hopper coater or a curtain coater, more preferably coated onto a transparent polymeric support including a subbing layer.

The dry thickness of the colour forming layer is preferably between 4 and 40 g/m², more preferably between 5 and 25 g/m², and most preferably between 6 and 15 g/m².

Leuco Dyes

A number of classes of leuco dye materials are useful as the color forming compounds of this disclosure. Among the useful materials are, for example: azines such as oxazines, diazines and thiazines; triarylmethanes such as fluoresceins, rhodamines and rhodols; ketazines; barbituric acid leuco dyes and thiobarbituric acid leuco dyes.

The colour forming compound is preferably present in the colour forming layer in an amount of 0.5 to 5.0 g/m², more preferably in an amount of 1.0 to 3.0 g/m².

The following reaction mechanisms and colour forming compounds are suitable to form a coloured dye.

1. Fragmentation of a Leuco Dye

The reaction mechanism can be represented by:

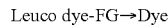

wherein FG represents a fragmenting group.

A preferred leuco dye (CASRN104434-37-9) is shown in EP 174054 A (POLAROID) which discloses a thermal imaging method for forming colour images by the irreversible unimolecular fragmentation of one or more thermally unstable carbamate moieties of an organic compound to give a visually discernible colour shift from colourless to coloured.

The fragmentation of a leuco dye may be a two-step reaction mechanism represented by:

wherein FG represents a fragmenting group.

The fragmentation of a leuco dye may be catalyzed or amplified by acids and acid generating agents. The leuco dyes G-(1) to G-(17) disclosed by U.S. Pat. No. 6,100,009 (FUJI) are catalyzed or amplified by polymeric acid generating agents based on A-(1) to A-(52), which are also suitable as acid generating agents in the present invention.

2. Protonation of a Leuco Dye After Fragmentation of a H-Donor-Precursor

The reaction mechanism can be represented by:

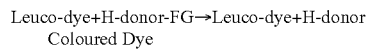

wherein FG represents a fragmenting group.

A preferred H-donor-FG compound includes an ester group as part of its chemical structure (the rest of the compound is represented by the group T) which by laser heating forms a carboxylic acid group:

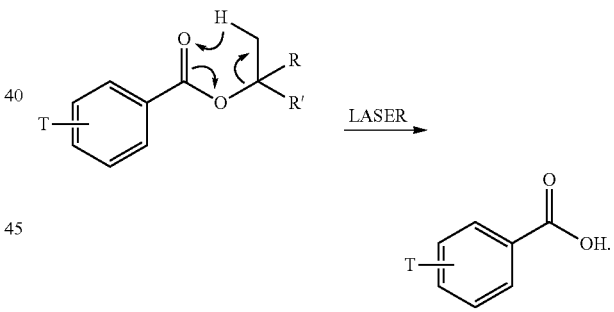

A more preferred H-donor-precursor includes a carbonate group, e.g. a tBOC group, as part of its chemical structure (the rest of the compound is represented by the group T) which by laser heating forms a phenol group:

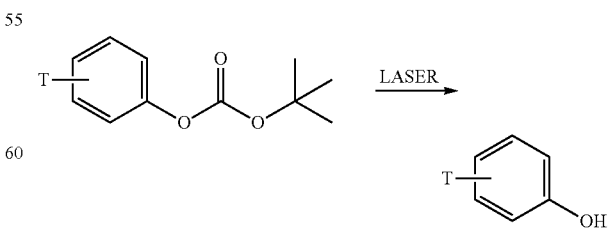

Preferred carbonate groups are given on page 8 of EP 605149 A (JUJO PAPER). In a preferred embodiment, the H-donor-FG compound contains 2 carbonate groups.

The most preferred H-donor-FG compound is:

HDP

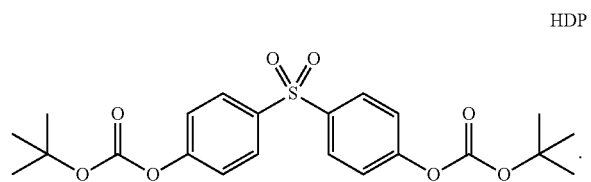 [SMILES: CC(C)(C)OC(=O)Oc1ccc(S(=O)(=O)c2ccc(OC(=O)OC(C)(C)C)cc2)cc1]

The synthesis of compound HDP (CASRN 129104-70-7) is given on page 31 of EP 605149 A (JUJO PAPER) for the compound (19).

In addition to the H-donor, the fragmentation of the H-donor-FG compound above also leads to the formation of a compound having a melting temperature lower than room temperature (20° C.). The formation of such a compound can be used as an additional security feature when the infrared dye is incompletely bleached. After laser marking a security element article through a polymeric support, such as a biaxially stretched polyethylene terephthalate polymeric foil, the compound having a melting temperature lower than room temperature may disturb a second laser marking (falsification of the security document) by the formation of visible blisters especially since higher infrared laser power will be needed due to the bleaching of the infrared dye.

3. Protonation of a Leuco Dye After a Re-Arrangement in a H-Donor-Precursor

The reaction mechanism can be represented by:

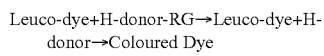

wherein RG represents a rearranging group.

A preferred H-donor-RG compound is capable of forming a compound having an allyl substituted phenol group as part of its chemical structure (the rest of the compound is represented by the group T) by laser heating:

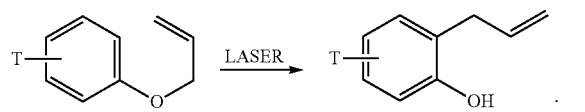

Preferred H-donor-RG compounds include 4,4'-diallyloxy diphenylsulfone whereof the synthesis is disclosed by EP 1452334 A (RICOH).

In contrast to the H-donor-FG compound of reaction mechanism 2, no compound having a melting temperature lower than room temperature (20° C.) is produced by the rearrangement of the H-donor-precursor to a hydrogen donor. Consequently, the infrared dye is bleached to a large extent and preferably completely bleached since the security feature of blister formation as possible with the H-donor-FG compound cannot be produced by the H-donor-RG compounds.

The colour formation according to the mechanisms 2 and 3 above are two-component reactions involving a leuco dye and a hydrogen donor-precursor, i.e. a 'H-donor-FG compound' or 'H-donor-RG compound', while the first reaction mechanism is an one-component reaction. The advantage of using a two-component reaction for the colour formation is that the stability, especially the shelf-life stability, can be enhanced. The probability of undesired colour formation due to environment heating is decreased by going from a single step reaction to a two step reaction involving the formation of the H-donor followed by a reaction of the formed H-donor with the leuco dye.

The preferred colour formation mechanism is the protonation of a leuco dye after fragmentation of the H-donor since it includes both advantages of the blister formation security feature and the enhanced shelf-life stability and does not require full bleaching of the infrared dye.

In a preferred embodiment of the colour forming layer, a combination is used of 4,4'-Bis(tert-butoxycarbonyloxy) diphenylsulfone (CASRN 129104-70-7) as the H-donor-FG compound with the leuco dye crystal violet lactone (CASRN 1552-42-7).

In a preferred embodiment, the magenta colour forming compound has a structure according to Formula MCFC:

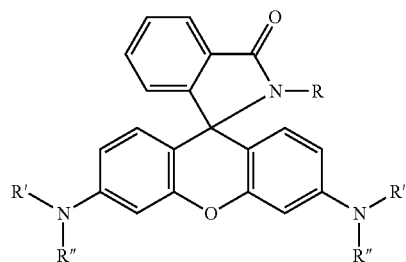

Formula MCFC, wherein R, R', R" are independently selected from the group consisting of a linear alkyl group, a branched alkyl group, an aryl and aralkyl group; or R' and R" are linked to form a heterocyclic ring.

In one embodiment, the magenta colour forming compound has a structure according to Formula MCFC, the R, R', R" may independently represent a linear alkyl group, a branched alkyl group, an aryl or an aralkyl group substituted by at least one functional group containing an oxygen atom, a sulphur atom or a nitrogen atom.

Particularly preferred magenta colour forming compounds include the compounds M-1 to M-6 of Table 1.

TABLE 1

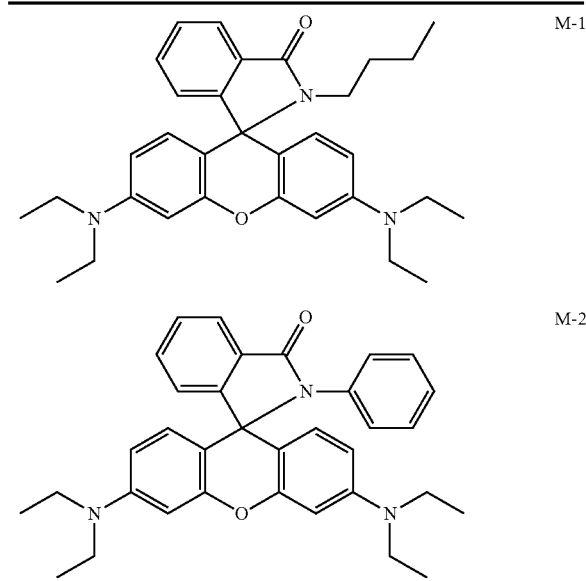

TABLE 1-continued

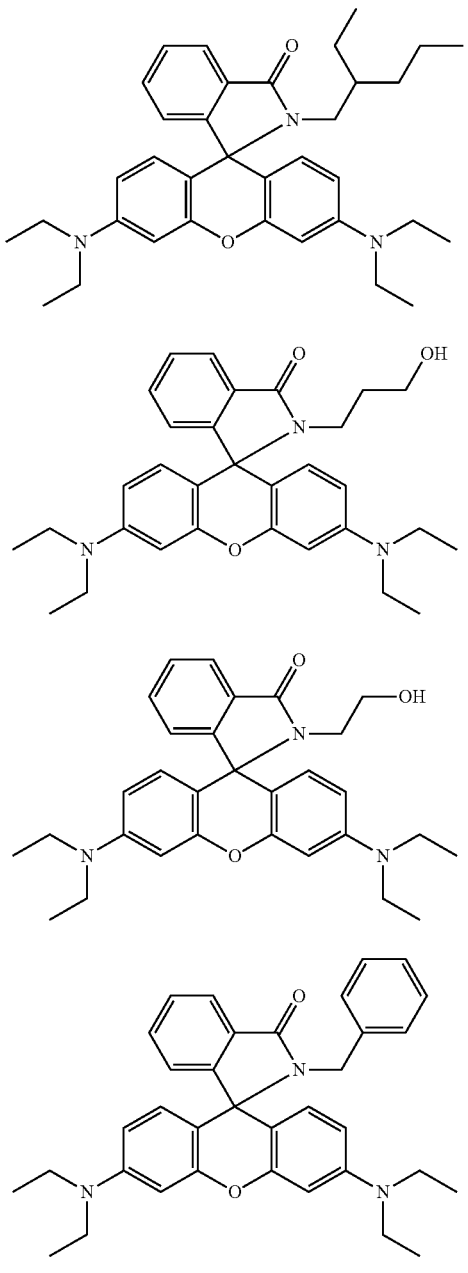

M-3

M-4

M-5

M-6

In a preferred embodiment, the yellow colour forming compound has a structure according to Formula YCFC:

Formula YCFC

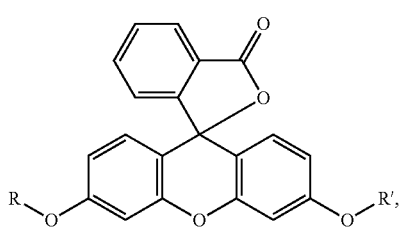

wherein R, R' are independently selected from a group consisting of a linear alkyl group, a branched alkyl group, an aryl and aralkyl group.

In one preferred embodiment, the yellow colour forming compound has a structure according to Formula YCFC, wherein R and R' independently represent a linear alkyl group, a branched alkyl group, an aryl or an aralkyl group substituted by at least one functional group containing an oxygen atom, a sulphur atom or a nitrogen atom.

A particularly preferred yellow colour forming compound is the compound according to Formula YCFC wherein both R and R' are methyl.

Infrared Dyes

The colour forming layer contains an infrared dye for the conversion of electromagnetic radiation into heat when the layer is laser marked by the infrared laser.

When multicoloured articles are desired, then the security element includes a plurality of colour forming layers containing different infrared dyes and colour forming compounds. The infrared dyes differ in wavelength of maximum absorption $\lambda_{max}$ so that they can be addressed by different infrared lasers with corresponding emission wavelengths causing colour formation only in the colour forming layer of the addressed infrared dye.

Suitable examples of infrared dyes include, but are not limited to, polymethyl indoliums, metal complex IR dyes, indocyanine green, polymethine dyes, croconium dyes, cyanine dyes, merocyanine dyes, squarylium dyes, chalcogenopyryloarylidene dyes, metal thiolate complex dyes, bis(chalcogenopyrylo)polymethine dyes, oxyindolizine dyes, bis(aminoaryl)polymethine dyes, indolizine dyes, pyrylium dyes, quinoid dyes, quinone dyes, phthalocyanine dyes, naphthalocyanine dyes, azo dyes, (metallized) azomethine dyes and combinations thereof.

A preferred infrared dye is 5-[2,5-bis[2-[1-(1-methylbutyl)benz[cd]indol-2(1H)-ylidene]ethylidene]cyclopentylidene]-1-butyl-3-(2-methoxy-1-methylethyl)-2,4,6(1H,3H,5H)-pyrimidinetrione (CASRN 223717-84-8) represented by the Formula IR-1:

IR-1

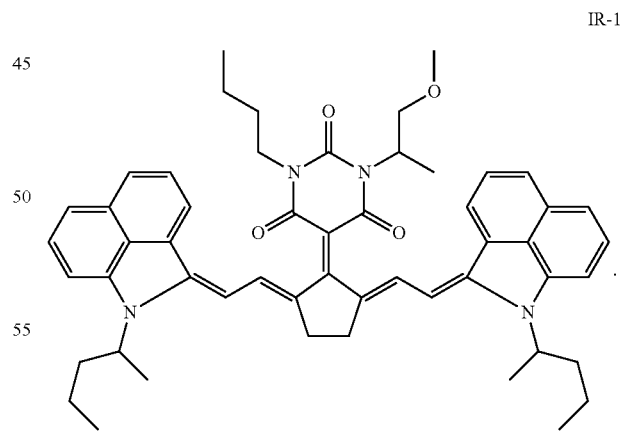

The infrared dye IR-1 has an absorption maximum $\lambda_{max}$ of 1052 nm making it very suitable for a Nd-YAG laser having an emission wavelength of 1064 nm.

The infrared red dye is preferably present in the colour forming layer in an amount of 0.01 to 1.0 g/m², more preferably in an amount of 0.02 to 0.5 g/m².

Thermal Acid Generating Compounds

The fragmentation of a leuco dye in the colour forming layer of the method of colour laser marking an article according to a preferred embodiment of the present invention may be catalyzed or amplified by acids and acid generating agents.

Suitable thermal acid generating agents may be the polymeric acid generating agents based the ethylenically unsaturated polymerizable compounds A-(1) to A-(52) disclosed by U.S. Pat. No. 6,100,009 (FUJI) and herein incorporated as a specific reference.

Suitable non-polymeric acid generating agents are the compounds A-(1) to A-(52) disclosed by U.S. Pat. No. 6,100,009 (FUJI) lacking the ethylenically unsaturated polymerizable group.

The thermal acid generating agent is preferably present in the amount of 10 to 20 wt %, more preferably 14 to 16 wt % based on the total dry weight of the colour forming layer.

Polymeric Binders

The colour forming layer includes a polymeric binder comprising vinyl acetate and at least 85 wt % of vinyl chloride based on the total weight of the binder.

In one preferred embodiment, the colour laser markable laminate according to the present invention contains an outer layer including a polymeric binder comprising vinyl acetate and at least 85 wt % of vinyl chloride based on the total weight of the binder. An advantage of the outer layer is that it is suitable as a receiver layer for dyes applied by thermal dye sublimation or even inkjet printing.

The polymeric binder in the colour forming layer and/or the outer layer is preferably a copolymer including at least 85 wt % of a vinyl chloride and 1 wt % to 15 wt % of vinyl acetate, more preferably a copolymer including at least 90 wt % of a vinyl chloride and 1 wt % to 10 wt % of vinyl acetate with all wt % based on the total weight of the binder.

In a preferred embodiment, the polymeric binder includes at least 4 wt % of vinyl acetate based on the total weight of the binder. The advantage of having at least 4 wt % of vinyl acetate in the polymeric binder is that the solubility of the polymeric binder is drastically improved in preferred coating solvents, such as methyl ethyl ketone.

In a more preferred embodiment, the polymeric binder consists of vinyl chloride and vinyl acetate.

The polymeric binder is preferably present in the colour forming layer in an amount of 5 to 30 g/m$^2$, more preferably in an amount of 6 to 20 g/m$^2$.

Transparent Polymeric Supports

The colour laser markable laminate includes a transparent polymeric support, preferably a transparent axially stretched polyester support. The colour forming layer is coated directly on the polymeric support or on a subbing layer present on the polymeric support for improving adhesion of the colour forming layer, thereby preventing falsification through delamination.

Suitable transparent polymeric supports include cellulose acetate propionate or cellulose acetate butyrate, polyesters such as polyethylene terephthalate and polyethylene naphthalate, polyamides, polycarbonates, polyimides, polyolefins, polyvinylchlorides, polyvinylacetals, polyethers and polysulphonamides.

In the most preferred embodiment, the transparent polymeric support is a biaxially stretched polyethylene terephthalate foil (PET-C foil) to be very durable and resistant to scratches and chemical substances.

The support preferably is a single component extrudate, but may also be co-extrudate. Examples of suitable co-extrudates are PET/PETG and PET/PC.

Polyester supports and especially polyethylene terephthalate supports are preferred because of their excellent properties of dimensional stability. When polyester is used as the support material, a subbing layer is preferably employed to improve the bonding of layers, foils and/or laminates to the support.

The manufacturing of PET-C foils and supports is well-known in the art of preparing suitable supports for silver halide photographic films. For example, GB 811066 (ICI) teaches a process to produce biaxially oriented polyethylene terephthalate foils and supports.

The polyethylene terephthalate is preferably biaxially stretched with a stretching factor of at least 2.0, more preferably at least 3.0 and most preferably a stretching factor of about 3.5. The temperature used during stretching is preferably about 160° C.

Methods to obtain opaque polyethylene terephthalate and biaxially oriented films thereof of have been disclosed in, e.g. US 2008238086 (AGFA).

White Opaque Core Supports

The colour laser markable document according to a preferred embodiment of the present invention includes an opaque white core support. The advantage of an opaque white core support is that any information present on the document is more easily readable and that a colour image is more appealing by having a white background.

Preferred opaque white core supports include resin coated paper supports, such as polyethylene coated paper and polypropylene coated paper, and synthetic paper supports such as Synaps™ synthetic paper of Agfa-Gevaert NV.

Other examples of useful high-quality polymeric supports for the present invention include opaque white polyesters and extrusion blends of polyethylene terephthalate and polypropylene. Also Teslin™ may be used as support.

Instead of a white support, a white opacifying layer can be coated onto a transparent polymeric support, such as those disclosed above. The opacifying layer preferably contains a white pigment with a refractive index greater than 1.60, preferably greater than 2.00, and most preferably greater than 2.60. The white pigments may be employed singly or in combination. Suitable white pigments include C.I. Pigment White 1, 3, 4, 5, 6, 7, 10, 11, 12, 14, 17, 18, 19, 21, 24, 25, 27, 28 and 32. Preferably titanium dioxide is used as pigment with a refractive index greater than 1.60. Titanium oxide occurs in the crystalline forms of anatase type, rutile type and brookite type. In a preferred embodiment of the present invention the rutile type is preferred because it has a very high refractive index, exhibiting a high covering power.

Subbing Layers

The polymeric support may be provided with one or more subbing layers. This has the advantage that the adhesion between the colour forming layer and the polymeric support is improved.

Useful subbing layers for this purpose are well known in the photographic art and include, for example, polymers of vinylidene chloride such as vinylidene chloride/acrylonitrile/acrylic acid terpolymers or vinylidene chloride/methyl acrylate/itaconic acid terpolymers.

The application of subbing layers is well-known in the art of manufacturing polyester supports for silver halide photographic films. For example, the preparation of such subbing layers is disclosed in U.S. Pat. No. 3,649,336 (AGFA) and GB 1441591 (AGFA).

Suitable vinylidene chloride copolymers include: the copolymer of vinylidene chloride, N-tert.-butylacrylamide, n-butyl acrylate, and N-vinyl pyrrolidone (e.g. 70:23:3:4), the copolymer of vinylidene chloride, N-tert.-butylacrylamide, n-butyl acrylate, and itaconic acid (e.g. 70:21:5:2), the copolymer of vinylidene chloride, N-tert.-butylacrylamide, and itaconic acid (e.g. 88:10:2), the copolymer of vinylidene chloride, n-butylmaleimide, and itaconic acid (e.g. 90:8:2), the copolymer of vinyl chloride, vinylidene chloride, and methacrylic acid (e.g. 65:30:5), the copolymer of vinylidene chloride, vinyl chloride, and itaconic acid (e.g. 70:26:4), the copolymer of vinyl chloride, n-butyl acrylate, and itaconic acid (e.g. 66:30:4), the copolymer of vinylidene chloride, n-butyl acrylate, and itaconic acid (e.g. 80:18:2), the copolymer of vinylidene chloride, methyl acrylate, and itaconic acid (e.g. 90:8:2), the copolymer of vinyl chloride, vinylidene chloride, N-tert.-butylacrylamide, and itaconic acid (e.g. 50:30:18:2). All the ratios given between brackets in the above-mentioned copolymers are ratios by weight.

In a preferred embodiment, the subbing layer has a dry thickness of no more than 2 μm or preferably no more than 200 mg/m².

Coating Solvents

For coating the colour forming layer and the outer layer, one or more organic solvents may be used. The use of an organic solvent facilitates the dissolution of the polymeric binder and specific ingredients such as the infrared dye.

A preferred organic solvent is methylethylketone (MEK) because it combines a high solubilizing power for a wide range of ingredients and it provides, on coating the colour forming layer, a good compromise between the fast drying of the layer(s) and the danger of fire or explosion thereby allowing high coating speeds.

Other Security Features

The colour laser markable laminate is preferably combined with one or more other security features to increase the difficulty for falsifying the document.

To prevent forgeries of identification documents, different means of securing are used. One solution consists in superimposing lines or guilloches on an identification picture such as a photograph. In that way, if any material is printed subsequently, the guilloches appear in white on added black background. Other solutions consist in adding security elements such as information printed with ink that reacts to ultraviolet radiation, micro-letters concealed in an image or text etc.

Suitable other security features such as anti-copy patterns, guilloches, endless text, miniprint, microprint, nanoprint, rainbow colouring, 1D-barcode, 2D-barcode, coloured fibres, fluorescent fibres and planchettes, fluorescent pigments, OVD and DOVID (such as holograms, 2D and 3D holograms, Kinegrams™, overprint, relief embossing, perforations, metallic pigments, magnetic material, Metamora colours, microchips, RFID chips, images made with OVI (Optically Variable Ink) such as iridescent and photochromic ink, images made with thermochromic ink, phosphorescent pigments and dyes, watermarks including duotone and multitone watermarks, ghost images and security threads.

Materials

All materials used in the following examples were readily available from standard sources such as ALDRICH CHEMICAL Co. (Belgium) and ACROS (Belgium) unless otherwise specified. The water used was deionized water.

CCE is Bayhydrol H 2558, a anionic polyester urethane (37.3%) from BAYER.

Hydran™ APX101H is a waterbased liquid of ionomer type polyester urethane using polyester segments based on terephthalic acid and ethylene glycol and hexamethylene diisocyanate available from DIC Europe GmbH.

Resorcinol from Sumitomo Chemicals.

Resor-sol is a 7.4 wt % aqueous solution of resorcinol (pH 8).

Par is a dimethyltrimethylolamine formaldehyde resin from Cytec industries.

PAR-sol is a 40 wt % aqueous solution of Par.

PEA is Tospearl 120 from Momentive Performance materials.

PEA-sol is a 10 wt % (50/50) aqueous/ethanol dispersion of PEA.

Dowfax™ 2A1 from Pilot Chemicals C is a Alkyldiphenyloxide disulfonate (4.5% wt %).

DOW-sol is a 2.5 wt % solution of Dowfax™ 2A1 in isopropanol.

Surfynol™ 420 from Air Products is a non ionic surfactant.

Surfynsol is a 2.5 wt % solution of Surfynol™ 420 in iso propanol.

MEK is an abbreviation used for methylethylketon.

Baysilon is a 1 wt % solution in MEK of the silicon oil Baysilon™ Lackadditive MA available from BAYER.

HDP is the hydrogen donor-precursor CASRN 129104-70-7 prepared according to the synthesis given on page 31 of EP 605149 A (JUJO PAPER) for the compound (19).

CVL is crystal violet lactone is CASRN 1552-42-7 available from Pharmorgana:

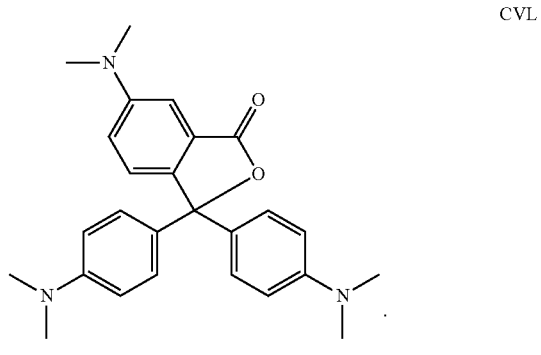

CVL

Rhodamine B (CASRN=81-88-9) is commercially available from TCI Europe.

M-1 is a magenta colour forming compound represented by the formula:

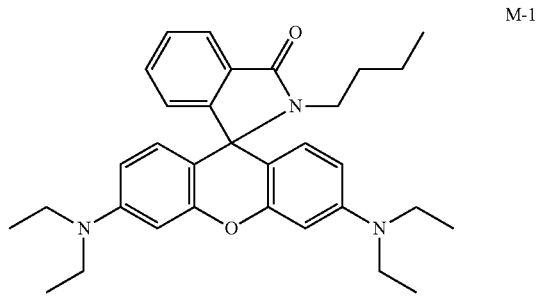 [SMILES: CCCCN1C(=O)c2ccccc2C12c1ccc(N(CC)CC)cc1Oc1cc(N(CC)CC)ccc12]

M-1

The magenta colour forming compound M-1 was synthesized as follows. A solution of Rhodamine B (24.0 g; 0.05 mol) and n. butylamine (15.0 g; 0.20 mol) in 1-methoxy-2-propanol (750 mL) was heated at 95° C. for 3 hours. After cooling to 45° C., a solution of ice water (25 mL)/methanol (25 mL) and triethylamine (1 mL) was added.

The precipitated crude M-1 was filtered and digested at 40° C. in acetonitrile (30 mL) containing triethylamine (0.5 mL). After cooling to 0° C., off-white M-1 was filtered and dried in vacuo. Yield: 21.5 g (85.5%).

S-Lec™ BL5 HP Z is a polyvinyl acetal polymer prepared by acetalisation of a copolymer of vinylalcohol and vinyl acetate with butyraldehyde, manufactured by Sekisui, Japan.

Elvacite™ 2010 is a polymethyl methacrylate grade available from Lucite International, USA.

CAB 381-2 is a cellulose acetate butyrate grade manufactured by Eastman Chemical and provided by Barentz.

Vinnol™ E15/48A is a hydroxyl-containing copolymer of 84 wt % vinyl chloride and 16 wt % of acrylic acid esters (2-hydroxypropyl acrylate) provided by Wacker AG.

UCAR™ VAGC is a medium molecular weight, hydroxyl-functional terpolymer comprised of 81% vinyl chloride, 4% vinyl acetate, and 15% of a hydroxyalkyl acrylate (2-hydroxypropyl acrylate) provided by Dow Chemical.

Vinnol™ H40/43 is a copolymer of 66 wt % vinyl chloride and 34 wt % of vinyl acetate provided by Wacker AG.

Vinnol™ H40/60 is a copolymer of 61 wt % vinyl chloride and 39 wt % of vinyl acetate provided by Wacker AG.

Ixan™ SGA1 is a copolymer of 46% vinylidene chloride, 46% vinyl chloride, 3% maleic anhydride and 1% acrylonitrile provided by Solvin SA, Belgium.

Vinnol™ H11-59 is a copolymer of 89 wt % vinyl chloride and 11 wt % of vinyl acetate provided by Wacker AG.

Ucar™ VYHH is a high molecular weight copolymer of 86% vinyl chloride and 14% vinyl acetate provided by Dow Chemical.

Vinnol™ H15/50 is a copolymer of 85 wt % vinyl chloride and 15 wt % of vinyl acetate provided by Wacker AG.

Solbin™ M5 is a copolymer of 85% vinyl chloride, 14% vinyl acetate and 1% of a dicarboxylic acid, provided by Nissin Chemical industry Co., Japan.

UCAR™ VAGD is a medium molecular weight copolymer of 90% vinyl chloride, 4% vinyl acetate and 6% vinylalcohol, provided by Dow Chemical.

Solbin™ AL is a copolymer of 93% vinyl chloride, 2% vinyl acetate and 5% vinylalcohol provided by Nissin Chemical industry Co., Japan.

Solbin™ A is a copolymer of 92% vinyl chloride, 3% vinyl acetate and 5% vinylalcohol provided by Nissin Chemical industry Co., Japan.

Solvin™ 561SF is a vinylchloride-vinylacetate copolymer with 6% vinyl acetate, provided by Solvin SA, Belgium.

Sunvac™ HH is a copolymer of 86 wt % vinyl chloride and 14 wt % vinyl acetate provided by Yantal Suny Chem International Co., Ltd, China.

DMF-DMA is dimethylformamide dimethylacetate.

THF is tetrahydrofuran.

IR-1 is a 0.15 wt % solution in MEK of the infrared dye CASRN 223717-84-8 and was prepared as described below.

The synthesis of intermediate INT-5 was carried out in a cascade mode without purification of the intermediates INT-1, INT-2, INT-3 and INT-4 as described below:

Intermediate-INT-1

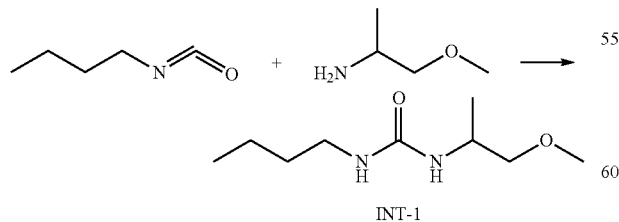

INT-1

To a solution of butyl isocyanate (1.03 eq.) in toluene (70 mL/mol) at 50° C. was added 2-amino-1-methoxy propane (1.00 eq.) over a 2 hour period. After stirring for 30 minutes, excess toluene and reagent were distilled off at 85° C./50 mbar and at 85° C./20 mbar respectively. The mixture was allowed to reach atmospheric pressure under nitrogen.

Intermediate-INT-2

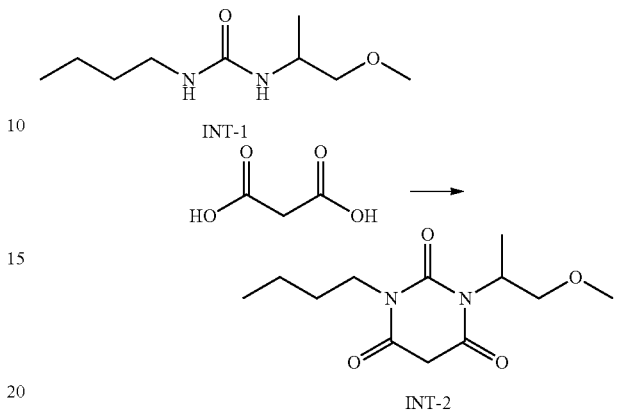

To the warm residue (INT-1) were consecutively added: acetic acid (140 mL/mol), malonic acid (1.00 eq.) and acetic anhydride (2.00 eq.). Under stirring the reaction mixture was gently warmed to 90° C. After stirring for 2.5 hours at 90° C., methanol (70 mL/mol) was added and the mixture was refluxed for 45 minutes. Subsequently, the solvents were removed at 100° C./70 mbar. After cooling to 30° C., methyl t. butyl ether (MTBE) (300 mL/mol) was added. This mixture was extracted 3× with a 5% NaCl solution in water and 2× with a satured NaCl solution in water. The MTBE was distilled off at 95° C./70 mbar. The remaining water was azeotropically removed with toluene. The mixture was allowed to reach room temperature under nitrogen at atmospheric pressure.

Intermediate-INT-3

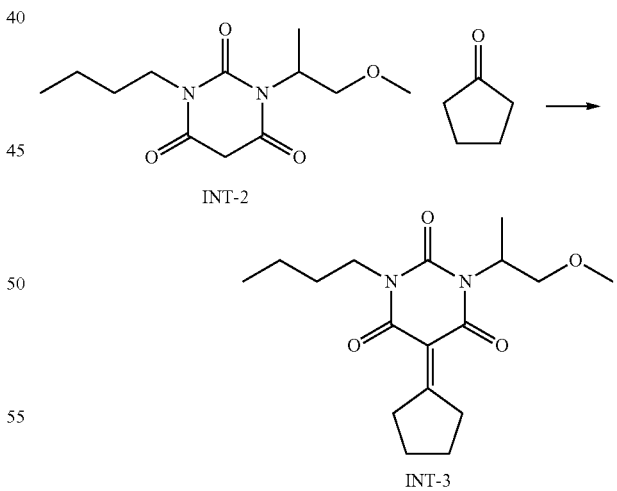

To the residue (INT-2) were consecutively added under a nitrogen blanket at room temperature: cyclopentanone (1.10 eq.), ammoniumacetate (0.07 eq.) and methanol (150 mL/mol). After refluxing for 4.5 hours, methanol was distilled off at 50 mbar. Remaining methanol and water were azeotropically removed with toluene. After cooling to room temperature, toluene (0.108 kg/mol) was added. This solution was filtered on a stainless steel filter covered with silica (30 g/mol). The reactor and the filter cake were washed with toluene (4×50 mL/mol). This solution of INT-3 was directly used in the next step Intermediate-INT-4

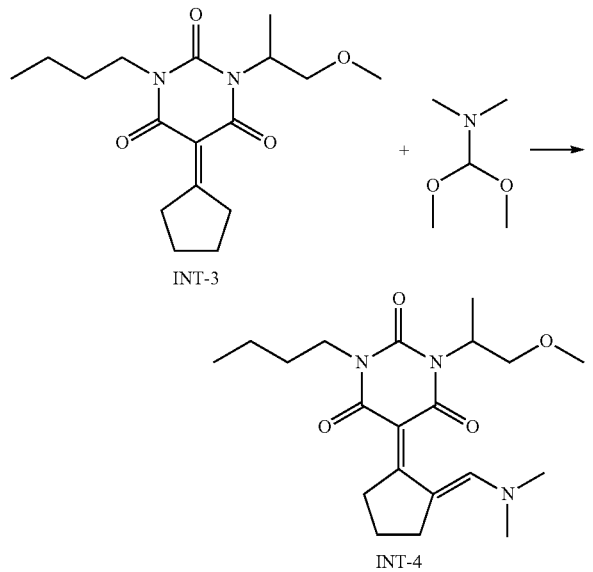

INT-3

To the toluene solution of INT-3 at room temperature was added acetic acid (1.00 eq.). Under a nitrogen blanket, DMF-DMA (1.13 eq.) was quickly (10 minutes) added at 10° C. After 5 minutes, n. hexane (830 mL/mol) was added, followed by another portion of n. hexane (415 mL/mol) after 30 minutes. After stirring for at least 1 hour (crystallisation) INT-4 is collected by filtration. After washing with n. hexane/toluene (100 mL/mol) and n. hexane (3×125 mL/mol), the product INT-4 was digested with n. hexane (500 mL/mol), filtered and dried at 25° C. for 24 hours.

Intermediate-INT-5

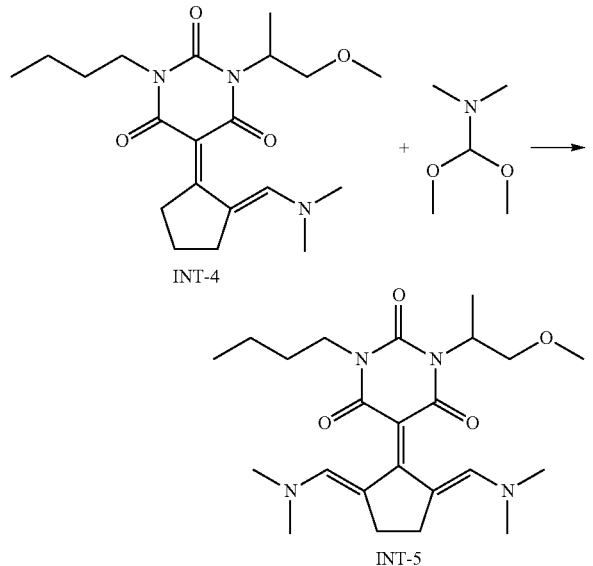

INT-4

INT-5

To a suspension of INT-4 in ethyl acetate (320 mL/mol) under nitrogen at room temperature was added DMF-DMA (3.49 eq.) in one portion. The mixture was heated to 65° C. and stirred at 65° C. for 25 minutes. While quickly cooling to 15° C., a mixture of MTBE (640 mL/mol) and n. hexane (160 mL/mol) was added. After stirring for 15 minutes, the product was filtered and consecutively washed with ethylacetate/MTBE 80/20 (200 mL/mol), ethylacetate/n. hexane 80/20 (200 mL/mol), ethylacetate/n. hexane 50/50 (200 mL/mol) and n. hexane (200 mL/mol). The rather unstable product (INT-5) was dried at 25° C. for 24 hours.

The synthesis of intermediate INT-7 was carried out in a cascade mode without purification of the intermediate INT-6 as described below:

Intermediate-INT-6

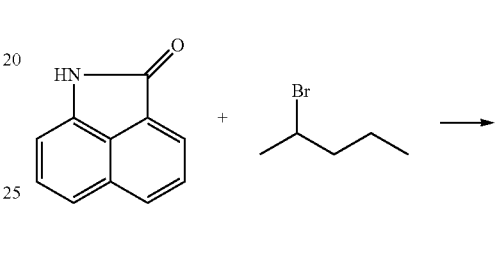

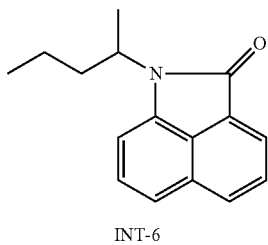

INT-6

To a nitrogen blanketed solution of 1,8-Naphtholactam (1.00 eq.) in sulfolane (250 mL/mol) at 70° C. were added potassium iodide (0.20 eq.) and dimethylaminopyridine (DMAP) (0.135 eq.). To this mixture was added potassium hydroxide (KOH) (0.60 eq.) and 2-bromo pentane (0.50 eq.). After 1 hour at 70-75° C. another portion of KOH (0.60 eq.) and 2-bromo pentane (0.50 eq.) were added, while distilling of the pentene side product. This was repeated 2 times. After cooling the reaction mixture was diluted with MTBE (1 L/mol) and washed with water. The water layer was extracted again with MTBE. The combined extracts were washed consecutively with a 15% NaCl solution in water, a 10% NaCl solution in water containing 4% HCl, a 15% NaCl solution in water containing 1% NaHCO3 and a 25% NaCl solution in water. The MTBE was distilled off and the remaining water was azeotropically removed with toluene. The crude INT-6 (oil) was used a such.

Intermediate-INT-7

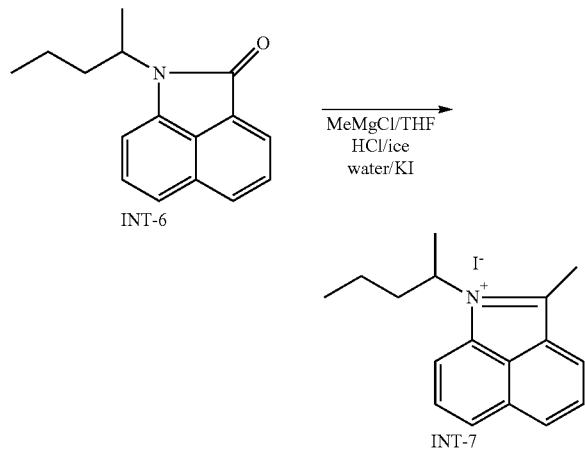

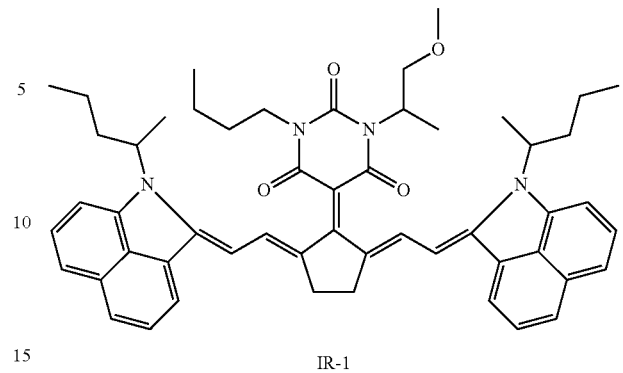

To nitrogen blanketed solution of INT-6 (1.00 eq.) in THF (100 mL/mol) at room temperature was added methyl magnesiumchloride (1.28 eq.) over 45 minutes (55-60° C.). After stirring for 1 hour at 55° C., the reaction mixture was added to a mixture of HCl (3.9 eq.) in ice water (3.66 kg/mol). After distillative removal of the THF, the aqueous solution was filtered and added to a solution of KI (2.00 eq.) in water (2.1 L/mol). After crystallisation, crude INT-7 was filtered and consecutively washed with water (2.55 L/mol) and ethyl acetate (2.55 L/mol) and dried at 40° C. Yield: 76%
IR-absorber-IR-1

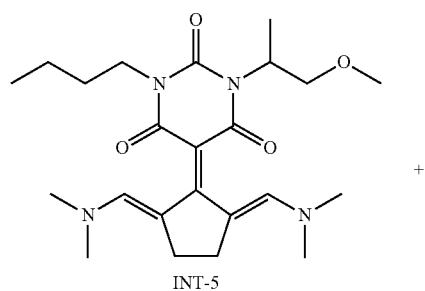

+

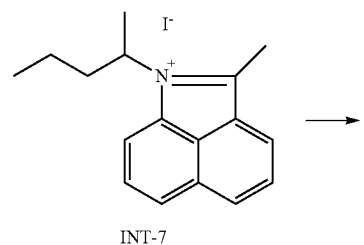

⟶

To a stirred suspension of INT-5 (1.00 eq.) in methyl acetate (4 L/mol) at 50° C., was added in portions INT-7 (2.10 eq.) over 5 minutes. After stirring for 1 hour at 55° C., 2 extra portions of INT-7 (each 0.016 eq.) were added. After stirring for 2.5 hours at 55° C., the reaction mixture was cooled to room temperature. Crude IR-1 was isolated by filtration and washed with ethyl acetate (4 L/mol). After digestion in water (to remove salts) (4 L/mol), filtering and washing on the filter with water (2 L/mol) and MTBE (1.5 L/mol) the product was dried at 40° C. Yield=92%.

CS-1 is 6-O-palmitoyl-L-ascorbic acid (CASRN137-66-6) from BASF.

CS-2 is TOCOBLEND™ L70 IP (CASRN1406-66-2) from VITABLEND NEDERLAND BV including formula:

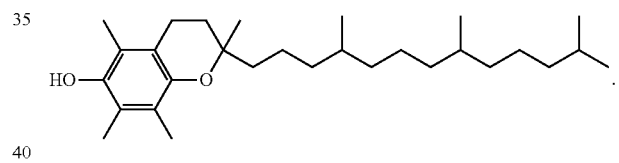

CS-3 is CASRN216698-06-5 having the formula:

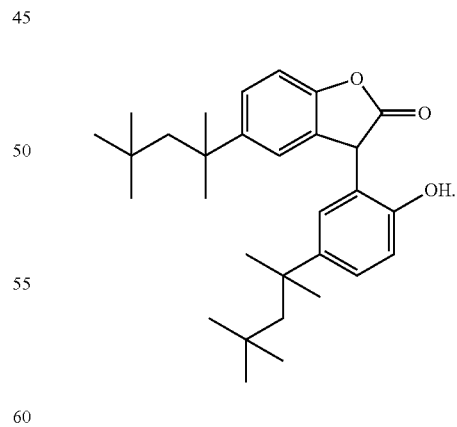

CS-4 is gallic acid ethyl ester (CASRN831-61-8) from ACROS.

CS-5 is 3,6-dithia-1,8-octanediol (CASRN5244-34-8) from ALDRICH.

CS-6 is Irganox™ 1035 (CASRN41484-35-9) from CIBA having formula:

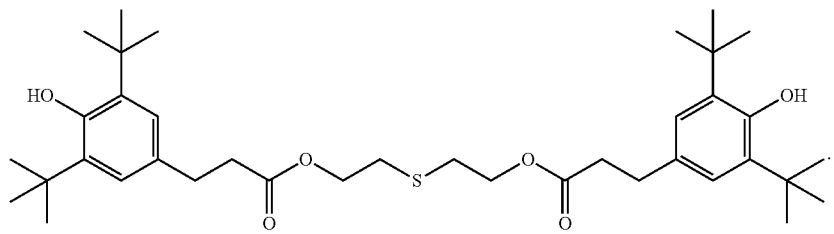 [SMILES: CC(C)(C)c1cc(CCC(=O)OCCSCCOC(=O)CCc2cc(C(C)(C)C)c(O)c(C(C)(C)C)c2)cc(C(C)(C)C)c1O]

CS-7 is ADK STAB PEP36 (CASRN80693-00-1) from PALMAROLE AG having formula:

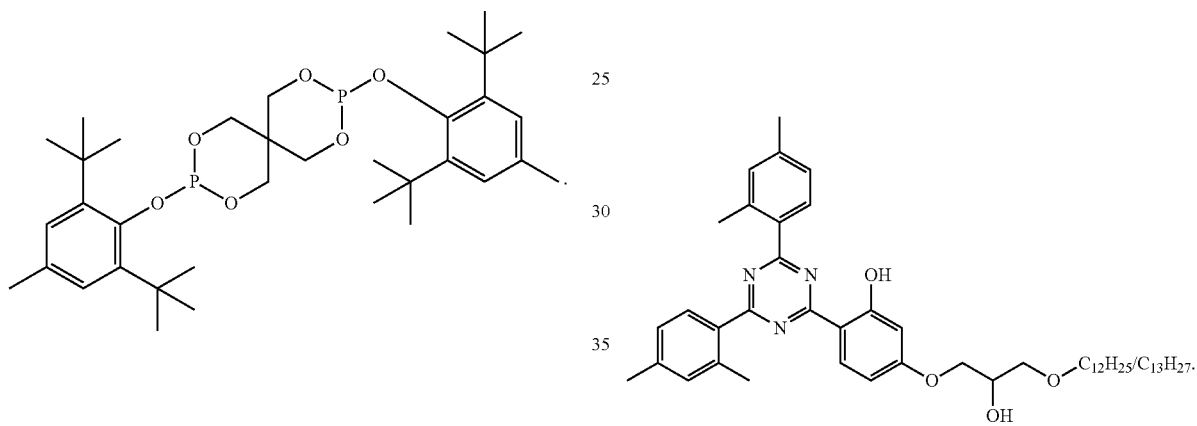

CS-8 is calcium stearate.
CS-9 is Tinuvin™ 292 (CASRN 41556-26-7) from BASF.
CS-10 is Irgastat™ P 18 (CASRN401844-75-5) from CIBA.
CS-11 is Tinuvin™ 123 (CASRN 122586-52-1) from BASF.
CS-12 is 1-dibutylacetamido-mercaptotetrazole (CASRN168612-06-4) from Chemosyntha.
CS-13 is 1-(3,4-dichlorophenyl)-1,2-dihydro-5H-tetrazole-5-thione (CASRN63684-99-1) from NOVASEP.
CS-14 is CYASORB™ UV1164 (CASRN2725-22-6) from CYTEC INDUSTRIES BV having formula:

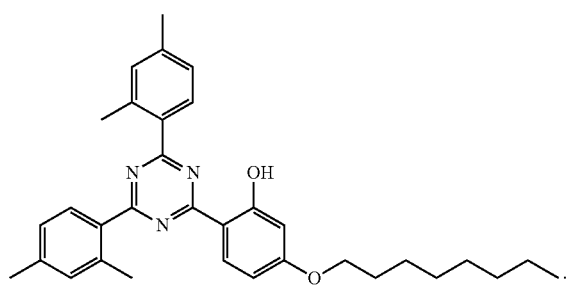 [SMILES: CCCCCCCCOc1ccc(-c2nc(-c3ccc(C)cc3C)nc(-c3ccc(C)cc3C)n2)c(O)c1]

CS-15 is Tinuvin™ 400 (CASRN 192662-79-6) from CIBA having formula:

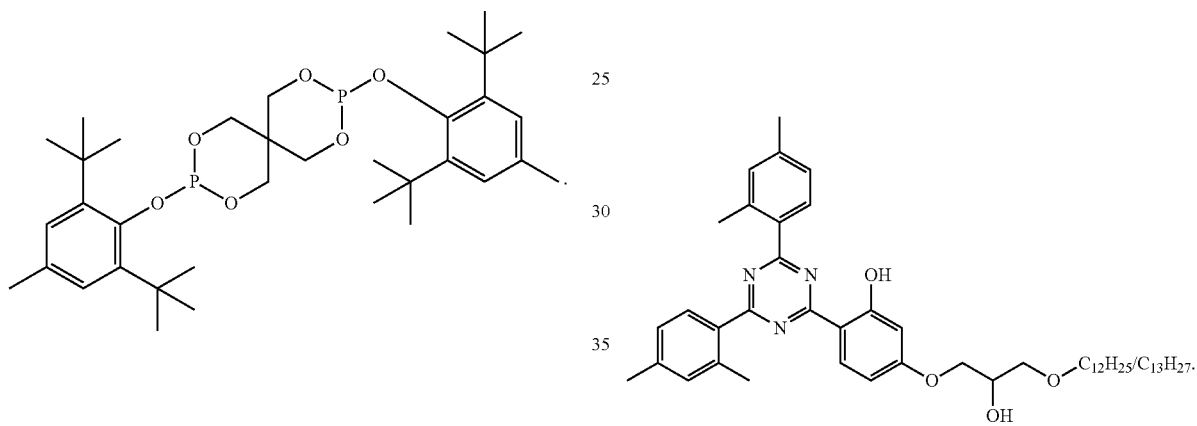

CS-16 is 2-(2,4-dihydroxyphenyl)-4,6-bis-(2,4-dimethylphenyl)-s-triazine (CASRN1668-53-7) from Capot Chemical Ltd.
CS-17 is 4-[4,6-bis(2-methylphenoxy)-1,3,5-triazin-2-yl]-1,3-benzenediol (CASRN13413-61-1).
CS-18 is Tinuvin™ P (CASRN2440-22-4) from CIBA having formula:

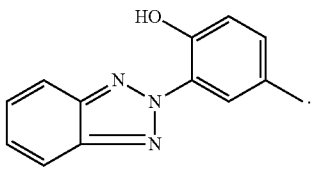 [SMILES: Cc1ccc(O)c(-n2nc3ccccc3n2)c1]

CS-19 is Tinuvin™ 360 (CASRN103597-45-1) from CIBA having formula:

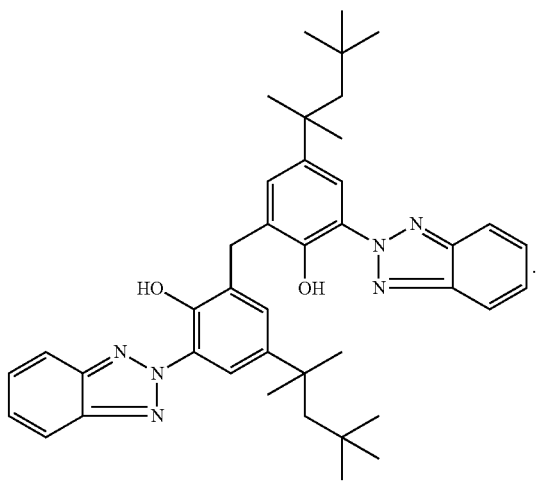 [SMILES: CC(C)(C)CC(C)(C)c1cc(Cc2cc(C(C)(C)CC(C)(C)C)cc(-n3nc4ccccc4n3)c2O)c(O)c(-n2nc3ccccc3n2)c1]

CS-20 is Tinuvin™ 171 (CASRN23328-53-2) from CIBA having formula:

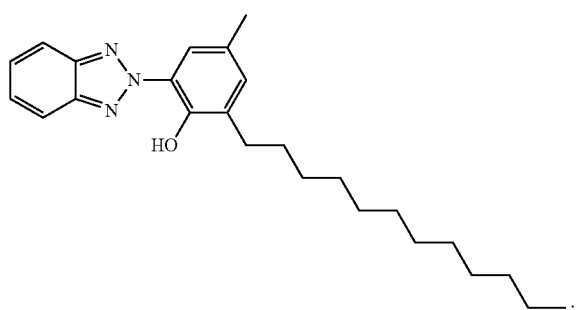 [SMILES: CCCCCCCCCCCCc1cc(C)cc(-n2nc3ccccc3n2)c1O]

CS-21 is Mixxim™ BB/100 (CASRN103597-45-1) from FAIRMOUNT.

CS-22 is Tinuvin™ 1130 (CASRN 104810-48-2) from CIBA.

CS-23 is Hostavin™ 3225-2 DISP XP from CLARIANT is a mixture including a HALS compound (CASRN64338-16-5) and:

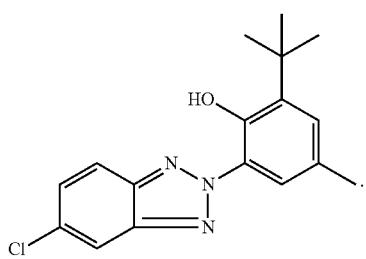 [SMILES: Cc1cc(-n2nc3ccc(Cl)cc3n2)c(O)c(C(C)(C)C)c1]

IS-1 is CASRN208343-47-9 for which Tinuvin™ 460 from CIBA was used.

IS-2 is CASRN70321-86-7 for which Tinuvin™ 234 from CIBA was used.

IS-3 is CASRN36437-37-3 for which Tinuvin™ 350 from CIBA was used.

IS-4 is CASRN3864-99-1 for which Tinuvin™ 327 from CIBA was used.

Measurement Methods

1. Optical Density

The optical density was measured in reflection using a spectrodensitometer Type Macbeth TR924 using a visual filter.

2. Light Stability

The light stability was measured using an Atlas™ Suntest by exposing the security documents with using a xenon-lamp for a specified number of hours at 250 W/m².

For a good light stability, the minimum optical density $D_{min}$ should be preferably no more than 0.40 after 2 hours, and preferably no more than 0.55 after 8 hours.

Example 1

This example illustrates that good image quality colour formation can only be obtained with a security document precursor containing a polymeric binder in accordance with the present invention.

Preparation of PET-C Foil PET1

A coating composition SUB-1 was prepared by mixing the components according to Table 1 using a dissolver.

TABLE 1

| Components of SUB-1 | wt % |
|---|---|
| deionized water | 76.66 |
| CCE | 18.45 |
| Resorcinol | 0.98 |
| PAR-sol | 0.57 |
| PEA-sol | 0.68 |
| DOW-sol | 1.33 |
| Surfynsol | 1.33 |

A 1100 μm thick polyethylene terephthalate sheet was first longitudinally stretched and then coated with the coating composition SUB-1 to a wet thickness of 10 μm. After drying, the longitudinally stretched and coated polyethylene terephthalate sheet was transversally stretched to produce a 63 μm thick sheet PET1, which was transparent and glossy.

Preparation of Colour Laser Markable Laminates

The coating compositions COL-1 to COL-16 were all prepared in the same way by mixing the components according to Table 2 using a dissolver but using the polymer POL as given by Table 3.

TABLE 2

| Components | wt % |
|---|---|
| Baysilon | 1.20 |
| MEK | 6.71 |
| Polymer POL | 56.96 |
| IR-1 | 29.20 |
| HDP | 3.08 |
| CVL | 2.85 |

TABLE 3

| Coating composition | Polymer POL |
|---|---|
| COL-1 | S-Lec ™ BL5 HP Z |
| COL-2 | Elvacite ™ 2010 |
| COL-3 | CAB 381-2 |
| COL-4 | Vinnol ™ E15/48A |
| COL-5 | UCAR ™ VAGC |
| COL-6 | Vinnol ™ H40/43 |
| COL-7 | Vinnol ™ H40/60 |

TABLE 3-continued

| Coating composition | Polymer POL |
|---|---|
| COL-8 | Solvin ™ 250SB |
| COL-9 | Vinnol ™ H11-59 |
| COL-10 | Ucar ™ VYHH |
| COL-11 | Vinnol ™ H15/50 |
| COL-12 | Solbin ™ M5 |
| COL-13 | UCAR ™ VAGD |
| COL-14 | Solbin ™ AL |
| COL-15 | Solbin ™ A |
| COL-16 | Solvin ™ 561SF |

Each coating composition COL-1 to COL-16 was coated with an Elcometer Bird Film Applicator (from ELCOMETER INSTRUMENTS) on the subbed PET-C support PET1 at a coating thickness of 100 μm and subsequently dried for 2 minutes at 20° C. on the film applicator and for a further 15 minutes in an oven at 75° C. to deliver the colour laser markable laminates SF-1 to SF-16.

Preparation of Colour Laser Markable Documents

The colour laser markable laminates SF-1 to SF-16 were then laminated onto a 500 μm opaque PETG core from WOLFEN to deliver the colour laser markable documents SDP-1 to SDP-16. The lamination was performed using an Oasys OLA6/7 plate laminator with the settings: LPT=115° C., LP=40, Hold=210 sec, HPT=115° C., HP=40 and ECT=50° C.

Evaluation and Results

After lamination, a test image containing a wedge with different grey-levels (ten squares of 7×9 mm) was laser marked on the colour laser markable documents SDP-1 to SDP-16 through the PET-C foil using a Rofin RSM Powerline E laser (10 W) with settings 33 ampere and 44 kHz.

The minimum optical density $D_{min}$ of the non-laser marked square and the maximum optical density were determined for all the samples. The value of ΔD is the difference between $D_{max}$ and $D_{min}$ and is indicative for the number of grey levels that can be obtained. The higher ΔD, the more grey levels and thus the better the image quality. A good image quality requires a ΔD of at least 0.75 and a Dmin of less than 0.50, preferably less than 0.35. The results are shown by Table 4.

TABLE 4

| Laser marked Sample | wt % Chlorinated ethylene | wt % Vinyl acetate | $D_{min}$ | $D_{max}$ | ΔD |
|---|---|---|---|---|---|
| SDP-1 | 0 | 1.4 | 0.32 | 0.32 | 0.00 |
| SDP-2 | 0 | 0 | 0.22 | 0.22 | 0.00 |
| SDP-3 | 0 | 0 | 0.28 | 0.28 | 0.00 |
| SDP-4 | 84 | 0 | 0.48 | 0.94 | 0.46 |
| SDP-5 | 80 | 20 | 0.39 | 0.88 | 0.49 |
| SDP-6 | 66 | 34 | 0.25 | 0.62 | 0.37 |
| SDP-7 | 61 | 39 | 0.53 | 0.84 | 0.31 |
| SDP-8 | 92 | 0 | 0.53 | 1.08 | 0.55 |
| SDP-9 | 89 | 11 | 0.23 | 1.31 | 1.08 |
| SDP-10 | 86 | 14 | 0.25 | 1.16 | 0.91 |
| SDP-11 | 85 | 15 | 0.25 | 1.08 | 0.83 |
| SDP-12 | 85 | 14 | 0.34 | 1.24 | 0.90 |
| SDP-13 | 90 | 4 | 0.33 | 1.16 | 0.83 |
| SDP-14 | 93 | 2 | 0.40 | 1.17 | 0.77 |
| SDP-15 | 92 | 3 | 0.42 | 1.23 | 0.81 |
| SDP-16 | 93 | 7 | 0.24 | 1.14 | 0.90 |

From Table 4, it should be clear that good image quality colour formation was obtained with only with the colour laser markable documents SDP-9 to SDP-16 containing a polymeric binder in accordance with present invention.

Example 2

This example illustrates how colour laser markable laminates including a leuco dye and an infrared dye can be improved for preventing additional colour formation upon longer daylight storage, by making a specific combination of a polymeric binder comprising vinyl acetate and at least 85 wt % of vinyl chloride based on the total weight of the binder and a phenol stabilizer sterically hindered by a ring containing three nitrogen atoms.

Preparation of PET-C Foil PET2

A coating composition SUB-2 was prepared by mixing the components according to Table 5 using a dissolver.

TABLE 5

| Components of SUB-2 | Volume (mL) |
|---|---|
| deionized water | 700.9 |
| Hydran ™ APX101H | 146.6 |
| Resor-sol | 125.0 |
| PAR-sol | 5.0 |
| PEA-sol | 7.5 |
| DOW-sol | 15.0 |

A 1100 μm thick polyethylene terephthalate sheet was first longitudinally stretched and then coated with the coating composition SUB-2 to a wet thickness of 10 μm. After drying, the longitudinally stretched and coated polyethylene terephthalate sheet was transversally stretched to produce a 63 μm thick sheet PET2, which was transparent and glossy.

Preparation of Colour Laser Markable Laminates

Coating compositions were prepared by mixing all components of Table 6 using a dissolver in MEK and were then coated with an Elcometer Bird Film Applicator (from ELCOMETER INSTRUMENTS) on the subbed PET-C support PET2 at a wet coating thickness of 100 μm and subsequently dried for 2 minutes at 20° C. on the film applicator and for a further 15 minutes in an oven at 75° C. to deliver colour laser markable laminates having a stabilizer and a leuco dye according to Table 7. The colour forming layer of a colour laser markable laminate lacking a stabilizer had a dry weight composition according to COAT-A, while the colour forming layer of a colour laser markable laminate including a stabilizer had a dry weight composition according to COAT-B as shown by Table 6.

TABLE 6

| mg/m² of compound: | COAT-A | COAT-B |
|---|---|---|
| Baysilon | 0.012 | 0.012 |
| Sunvac ™ HH | 7.500 | 7.500 |
| IR-1 | 0.030 | 0.030 |
| HDP | 1.625 | 1.625 |
| Leuco Dye | 1.500 | 1.500 |
| Stabilizer |  | 1.400 |
| Total dry weight = | 10.667 | 12.067 |

Preparation of Colour Laser Markable Documents

The colour laser markable laminates having a stabilizer and a leuco dye according to Table 7 were then laminated onto a 500 μm opaque PETG core from WOLFEN to deliver the colour laser markable documents COMP-1 to COMP-25 and INV-1 to INV-5. The lamination was performed using an Oasys OLA6/7 plate laminator with the settings: LPT=130° C., LP=40, Hold=210 sec, HPT=130° C., HP=40 and ECT=50° C.

Evaluation and Results

After lamination, a test image containing a wedge with different grey-levels (ten squares of 7×9 mm) was laser marked on the colour laser markable documents COMP-1 to COMP-25 and INV-1 to INV-5 through the PET-C foil using a Rofin RSM Powerline E laser (10 W) with settings 33 ampere and 44 kHz. $D_{min}$ is the background density, i.e. the optical density of a non-laser marked area.

The colour laser markable documents COMP-1 to COMP-25 and INV-1 to INV-5 were then exposed for 2 hours at 250 W/m² (Atlas™ Suntest).

TABLE 7

| Colour laser markable document | Stabilizer | Leuco dye | $D_{min}$ before exposure | $D_{min}$ after exposure |
|---|---|---|---|---|
| COMP-1 | — | CVL | 0.22 | 0.62 |
| COMP-2 | — | M-1 | 0.20 | 0.61 |
| COMP-3 | CS-1 | CVL | 0.81 | 0.91 |
| COMP-4 | CS-2 | CVL | 0.21 | 0.69 |
| COMP-5 | CS-3 | CVL | 0.35 | 0.62 |
| COMP-6 | CS-4 | CVL | 0.49 | 0.71 |
| COMP-7 | CS-5 | CVL | 0.23 | 0.69 |
| COMP-8 | CS-6 | CVL | 0.22 | 0.65 |
| COMP-9 | CS-7 | CVL | 0.27 | 0.59 |
| COMP-10 | CS-8 | CVL | 0.20 | 0.62 |
| COMP-11 | CS-9 | CVL | 0.20 | 0.45 |
| COMP-12 | CS-10 | CVL | 0.23 | 0.62 |
| COMP-13 | CS-11 | CVL | 0.21 | 0.64 |
| COMP-14 | CS-12 | CVL | 0.39 | 0.70 |
| COMP-15 | CS-13 | CVL | 0.48 | 0.77 |
| COMP-16 | CS-14 | CVL | 0.20 | 0.51 |
| COMP-17 | CS-15 | CVL | 0.22 | 0.57 |
| COMP-18 | CS-16 | CVL | 0.31 | 0.61 |
| COMP-19 | CS-17 | CVL | 0.35 | 0.77 |
| COMP-20 | CS-18 | CVL | 0.20 | 0.48 |
| COMP-21 | CS-19 | CVL | 0.20 | 0.47 |
| COMP-22 | CS-20 | CVL | 0.20 | 0.46 |
| COMP-23 | CS-21 | CVL | 0.22 | 0.52 |
| COMP-24 | CS-22 | CVL | 0.21 | 0.51 |
| COMP-25 | CS-23 | CVL | 0.22 | 0.45 |
| INV-1 | IS-1 | CVL | 0.21 | 0.35 |
| INV-2 | IS-1 | M-1 | 0.21 | 0.23 |
| INV-3 | IS-2 | CVL | 0.20 | 0.38 |
| INV-4 | IS-3 | CVL | 0.20 | 0.40 |
| INV-5 | IS-4 | CVL | 0.20 | 0.33 |

From the results in Table 7, it can be seen that only the colour laser markable documents INV-1 to INV-5 having the polymeric binder and the phenol stabilizer sterically hindered by a ring containing three nitrogen atoms in accordance with the present invention exhibited good lightstability. Colour laser markable documents including phenol stabilizers not sterically hindered by a ring containing three nitrogen atoms such as CS-2, CS-3 and CS-6 exhibited high $D_{min}$ values after exposure to the sun test. Also other known stabilizers like tetrazol compounds, HALS compounds and compounds CS-14 to CS-23 related to the stabilizers of the present invention exhibited inferior background densities.

Example 3

This example illustrates how colour laser markable laminates including a leuco dye and an infrared dye and a polymeric binder comprising vinyl acetate and at least 85 wt % of vinyl chloride based on the total weight of the binder can be improved for preventing additional colour formation upon longer daylight storage by including the phenol stabilizer sterically hindered by a ring containing three nitrogen atoms in an outer layer.

Preparation of Colour Laser Markable Laminates

A 1100 μm thick polyethylene terephthalate sheet was first longitudinally stretched and then coated on both sides with the coating composition SUB-2 of Example 2 to a wet thickness of 10 μm. After drying, the longitudinally stretched and coated polyethylene terephthalate sheet was transversally stretched to produce a 63 μm thick sheet PET3, which was transparent and glossy.

A coating composition according to COAT-A of Table 6 with CVL as Leuco Dye was prepared by mixing all components using a dissolver in MEK and was then coated with an Elcometer Bird Film Applicator (from ELCOMETER INSTRUMENTS) on one side of the subbed PET-C support PET3 at a wet coating thickness of 100 μm and subsequently dried for 2 minutes at 20° C. on the film applicator and for a further 15 minutes in an oven at 75° C. to deliver twelve colour laser markable laminates CL-1.

Coating compositions according to OUTER-B of Table 8 were prepared by mixing the polymer Solvin™ 561SF and a stabilizer according to Table 9 using a dissolver in MEK and was then coated with an Elcometer Bird Film Applicator (from ELCOMETER INSTRUMENTS) on the other side of the subbed PET-C support PET3 at a wet coating thickness of 100 μm and subsequently dried for 2 minutes at 20° C. on the film applicator and for a further 15 minutes in an oven at 75° C. to deliver eleven colour laser markable laminates. A twelfth colour laser markable laminate lacking a stabilizer was prepared in an identical manner to obtain an outer layer of 7.500 mg Solvin™ 561SF/m² according to OUTER-A of Table 8.

COAT-B as shown by Table 8.

TABLE 8

| mg/m² of compound: | OUTER-A | OUTER-B |
|---|---|---|
| Solvin ™ 561SF | 7.500 | 7.500 |
| Stabilizer | — | 1.400 |
| Total dry weight = | 7.500 | 8.900 |

Preparation of Colour Laser Markable Documents

Figure 4:
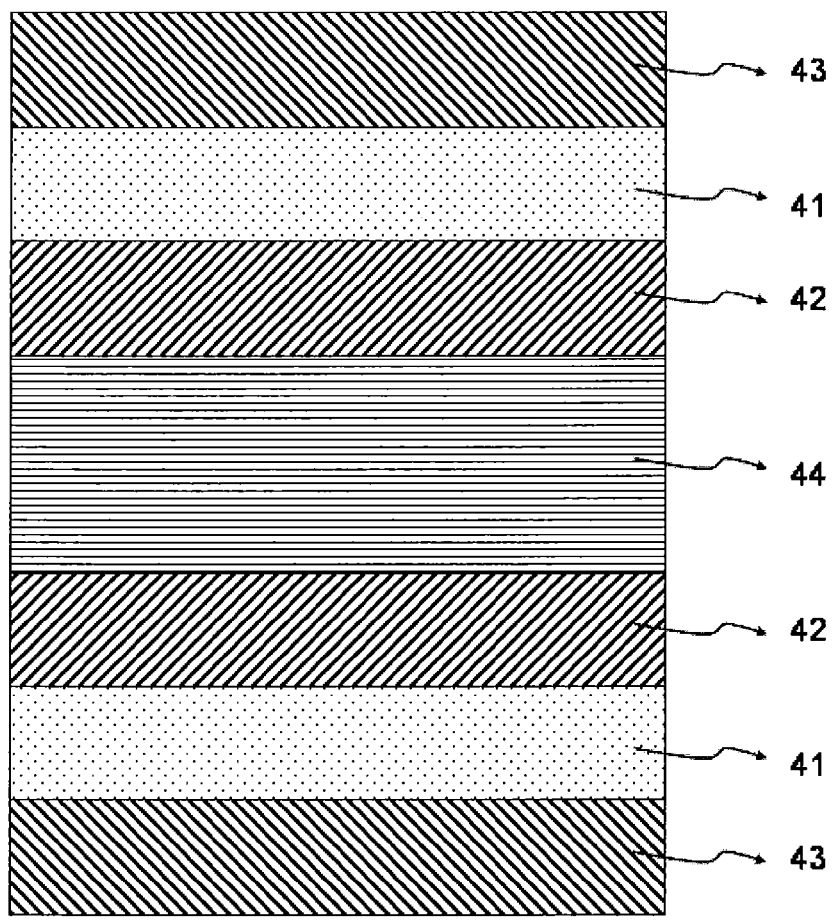
FIG. 4 shows a cross section of another preferred embodiment of a colour laser markable document according to the present invention including on both sides a colour laser markable laminate according to FIG. 2.

The colour laser markable laminates were then laminated onto a 500 μm opaque PETG core from WOLFEN to deliver the colour laser markable documents COMP-26 to COMP-32 and INV-6 to INV-9 with a document according to FIG. 4 (subbing layers omitted). The lamination was performed using an Oasys OLA6/7 plate laminator with the settings: LPT=130° C., LP=40, Hold=210 sec, HPT=130° C., HP=40 and ECT=50° C.

Evaluation and Results

After lamination, a test image containing a wedge with different grey-levels (ten squares of 7×9 mm) was laser marked on the colour laser markable documents COMP-26 to COMP-32 and INV-6 to INV-9 through the PET-C foil using a Rofin RSM Powerline E laser (10 W) with settings 33 ampere and 44 kHz. $D_{max}$ is the maximum density, i.e. the optical density of the laser marked area at maximum laser power used.

The colour laser markable documents COMP-26 to COMP-32 and INV-6 to INV-9 were then exposed for 8 hours at 250 W/m² (Atlas™ Suntest).

TABLE 9

| Colour laser markable document | Stabilizer | $D_{min}$ before exposure | $D_{min}$ after exposure | $D_{max}$ |
|---|---|---|---|---|
| COMP-26 | None | 0.22 | 0.74 | 1.20 |
| COMP-27 | CS-11 | 0.22 | 0.76 | 1.23 |
| COMP-28 | CS-15 | 0.21 | 0.75 | 1.05 |
| COMP-29 | CS-16 | 0.22 | 0.58 | 1.26 |
| COMP-30 | CS-17 | 0.20 | 0.60 | 1.14 |
| COMP-31 | CS-19 | 0.18 | 0.47 | 0.81 |
| COMP-32 | CS-23 | 0.22 | 0.43 | 0.85 |
| INV-6 | IS-1 | 0.20 | 0.45 | 1.07 |
| INV-7 | IS-2 | 0.22 | 0.55 | 1.15 |
| INV-8 | IS-3 | 0.21 | 0.55 | 1.11 |
| INV-9 | IS-4 | 0.22 | 0.53 | 1.23 |

Table 9 shows that only the colour laser markable documents INV-6 to INV-9 including the phenol stabilizer sterically hindered by a ring containing three nitrogen atoms in accordance with the present invention exhibited good light-stability and high laser markability (Dmax>1.00).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A colour laser markable laminate comprising:
   at least a transparent polymeric support; and
   a colour forming layer including:
      a leuco dye;
      an infrared dye; and
      a polymeric binder including vinyl acetate and at least 85 wt % of vinyl chloride based on a total weight of the binder; wherein
   the colour laser markable laminate includes a phenol stabilizer sterically hindered by a ring containing three nitrogen atoms represented by Formula (I):

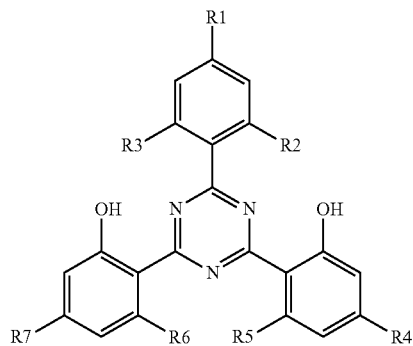

or Formula (II):

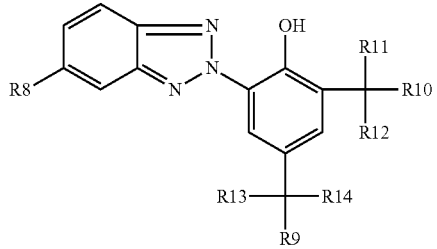

R1 to R7 is each independently selected from the group consisting of hydrogen, an alkyl group containing 1 to 12 carbon atoms, and an alkoxy group containing 1 to 12 carbon atoms;

R8 represents hydrogen or a halogen atom;

R9 and R10 is each independently selected from the group consisting of hydrogen, an alkyl group containing 1 to 6 carbon atoms, and an aryl group containing 1 to 12 carbon atoms; and R11 to R14 is each independently selected from the group consisting of an alkyl group containing 1 to 6 carbon atoms.

2. The colour laser markable laminate according to claim 1, wherein the phenol stabilizer sterically hindered by a ring containing three nitrogen atoms is selected from the group consisting of:

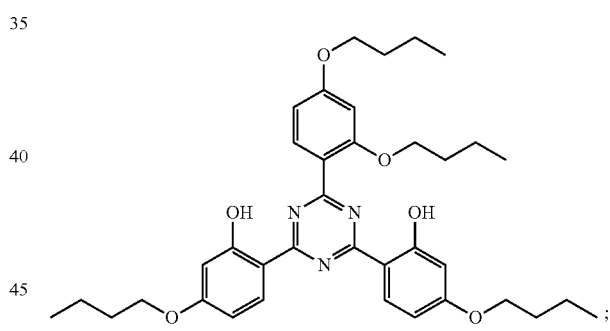

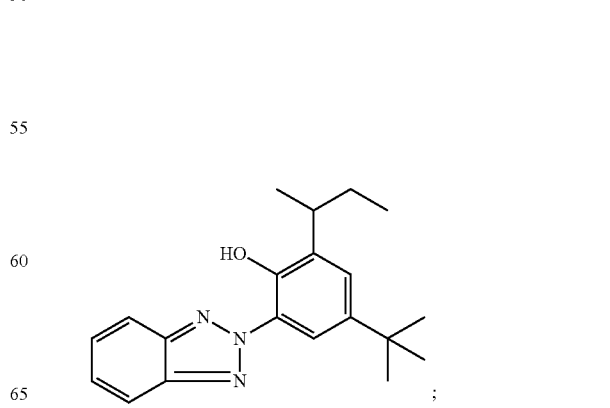

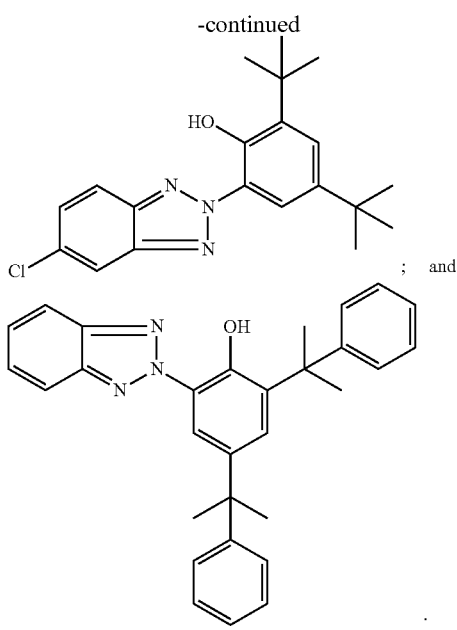

3. The colour laser markable laminate according to claim 1, wherein the phenol stabilizer sterically hindered by a ring containing three nitrogen atoms is present in the colour forming layer.

4. The colour laser markable laminate according to claim 1, further including an H-donor precursor.

5. The colour laser markable laminate according to claim 1, further comprising an outer layer on a side of the transparent polymeric support opposite to a side of the colour forming layer, wherein the phenol stabilizer sterically hindered by a ring containing three nitrogen atoms is present in the outer layer.

6. The colour laser markable laminate according to claim 5, wherein the outer layer includes a polymeric binder including vinyl acetate and at least 85 wt % of vinyl chloride based on the total weight of the binder.

7. A colour laser markable document comprising:
an opaque white core support; and
the colour laser markable laminate according to claim 5; wherein
the colour forming layer is located between the opaque white core support and the transparent polymeric support.

8. The colour laser markable document according to claim 7, further comprising a second colour laser markable laminate including:
at least a transparent polymeric support; and
a colour forming layer including:
a leuco dye;
an infrared dye; and
a polymeric binder including vinyl acetate and at least 85 wt % of vinyl chloride based on a total weight of the binder; wherein
the colour laser markable laminate includes a phenol stabilizer sterically hindered by a ring containing three nitrogen atoms represented by Formula (I):

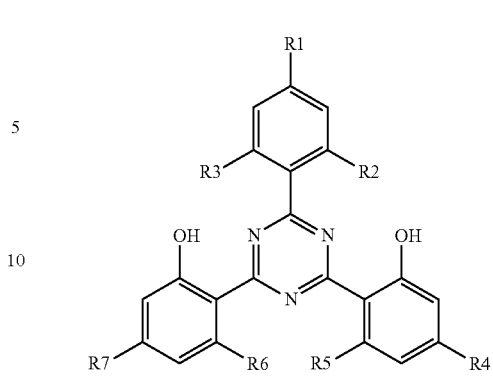

or Formula (II):

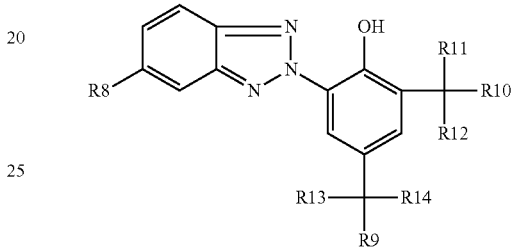

R1 to R7 is each independently selected from the group consisting of hydrogen, an alkyl group containing 1 to 12 carbon atoms, and an alkoxy group containing 1 to 12 carbon atoms;
R8 represents hydrogen or a halogen atom;
R9 and R10 is each independently selected from the group consisting of hydrogen, an alkyl group containing 1 to 6 carbon atoms, and an aryl group containing 1 to 12 carbon atoms; and
R11 to R14 is each independently selected from the group consisting of an alkyl group containing 1 to 6 carbon atoms; wherein
a colour forming layer in the second colour laser markable laminate is located between the opaque white core support and a transparent polymeric support in the second colour laser markable laminate.

9. The colour laser markable laminate according to claim 1, wherein the transparent polymeric support is a transparent axially stretched polyester support.

10. The colour laser markable laminate according to claim 9, wherein the transparent axially stretched polyester support is a transparent biaxially stretched polyterephthalate support.

11. A colour laser markable document comprising:
an opaque white core support; and
the colour laser markable laminate according to claim 1; wherein
the colour forming layer is located between the opaque white core support and the transparent polymeric support.

12. The colour laser markable document according to claim 11, further comprising a second colour laser markable laminate including:
at least a transparent polymeric support; and
a colour forming layer including:
a leuco dye;
an infrared dye; and
a polymeric binder including vinyl acetate and at least 85 wt % of vinyl chloride based on a total weight of the binder; wherein the colour laser markable laminate includes a phenol stabilizer sterically hindered by a ring containing three nitrogen atoms represented by Formula (I):

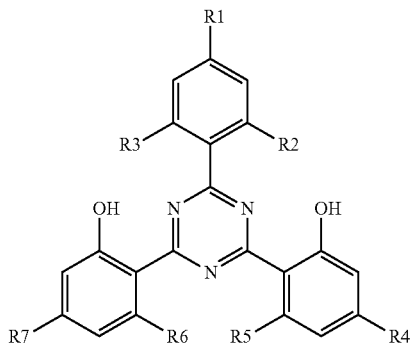

or Formula (II):

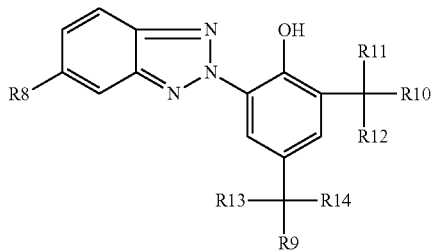

R1 to R7 is each independently selected from the group consisting of hydrogen, an alkyl group containing 1 to 12 carbon atoms, and an alkoxy group containing 1 to 12 carbon atoms;

R8 represents hydrogen or a halogen atom;

R9 and R10 is each independently selected from the group consisting of hydrogen, an alkyl group containing 1 to 6 carbon atoms, and an aryl group containing 1 to 12 carbon atoms; and R11 to R14 is each independently selected from the group consisting of an alkyl group containing 1 to 6 carbon atoms; wherein the colour forming layer of the second colour laser markable laminate is located between the opaque white core support and the transparent polymeric support of the second colour laser markable laminate.

13. The colour laser markable document according to claim 11, wherein the colour laser markable document is a security document precursor.

14. The colour laser markable document according to claim 13, further comprising an electronic chip.

15. The colour laser markable document according to claim 11, wherein the colour laser markable document contains on a same side of the opaque white core support as the colour forming layer at least one second colour forming layer that forms a colour different from a colour formed by the colour forming layer.

16. A method for preparing a colour laser marked document, the method comprising the steps of:

laminating the colour laser markable laminate according to claim 1 onto an opaque white core support; and laser marking the colour forming layer using an infrared laser.

17. The method according to claim 16, wherein the colour laser marked document is a security document selected from the group consisting of a passport, a personal identification card, and a product identification document.

* * * * *